Figure 1:
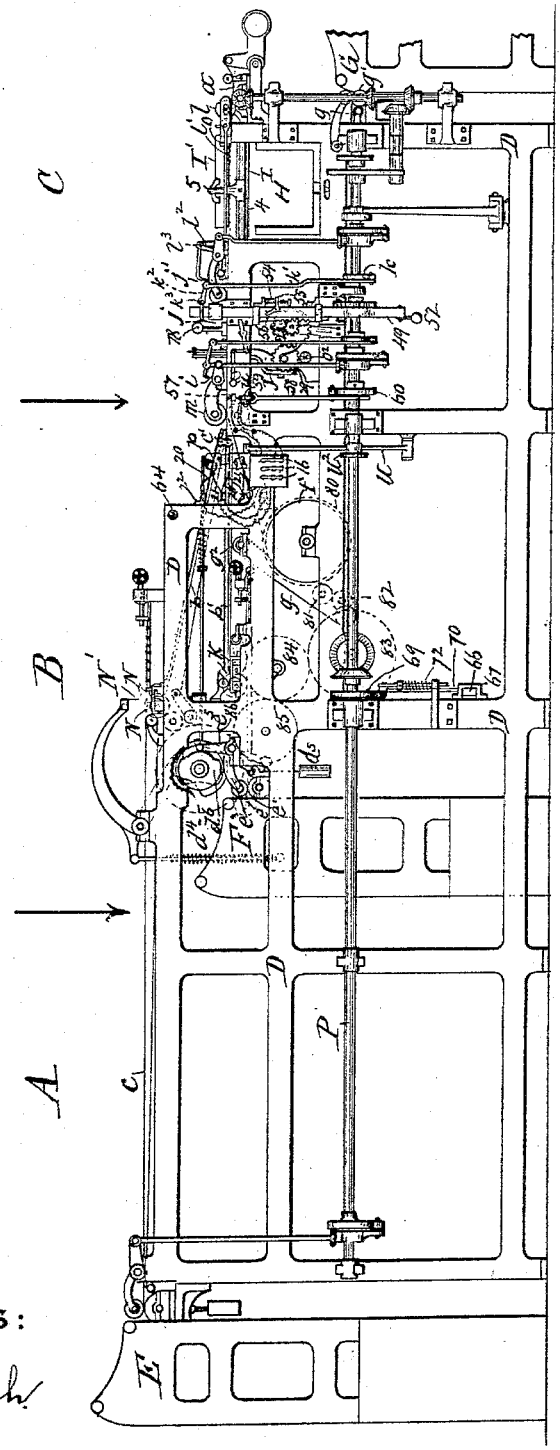

(No Model.) 22 Sheets—Sheet 2.
T. C. DEXTER.
PAPER ASSEMBLING AND STAPLING MACHINE.
No. 602,816. Patented Apr. 19, 1898.

WITNESSES:
INVENTOR:
Talbot C. Dexter
By E. Laass
his ATTORNEY (No Model.)

T. C. DEXTER.
PAPER ASSEMBLING AND STAPLING MACHINE.

No. 602,816. Patented Apr. 19, 1898.

WITNESSES:
H. B. Smith
J. J. Laass

INVENTOR
Talbot C. Dexter
By E. Laass
ATTORNEY (No Model.)

T. C. DEXTER.
PAPER ASSEMBLING AND STAPLING MACHINE.

No. 602,816.

22 Sheets—Sheet 5.

Patented Apr. 19, 1898.

WITNESSES:
H. B. Smith
J. J. Laass

INVENTOR:
Talbot C. Dexter
By E. Laass
his ATTORNEY (No Model.) 22 Sheets—Sheet 6.

T. C. DEXTER.
PAPER ASSEMBLING AND STAPLING MACHINE.

No. 602,816. Patented Apr. 19, 1898.

WITNESSES: INVENTOR:

(No Model.)

22 Sheets—Sheet 7.

T. C. DEXTER.
PAPER ASSEMBLING AND STAPLING MACHINE.

No. 602,816.

Patented Apr. 19, 1898.

WITNESSES:

INVENTOR:
Talbot C. Dexter
By E. Laass
his ATTORNEY (No Model.) 22 Sheets—Sheet 8.

T. C. DEXTER.
PAPER ASSEMBLING AND STAPLING MACHINE.

No. 602,816. Patented Apr. 19, 1898.

WITNESSES
H. B. Smith
J. J. Laass

INVENTOR
Talbot C. Dexter
By E. Laass
his ATTORNEY (No Model.) 22 Sheets—Sheet 12.

T. C. DEXTER.
PAPER ASSEMBLING AND STAPLING MACHINE.

No. 602,816. Patented Apr. 19, 1898.

WITNESSES:

INVENTOR:
Talbot C. Dexter
By E. Laass
his ATTORNEY

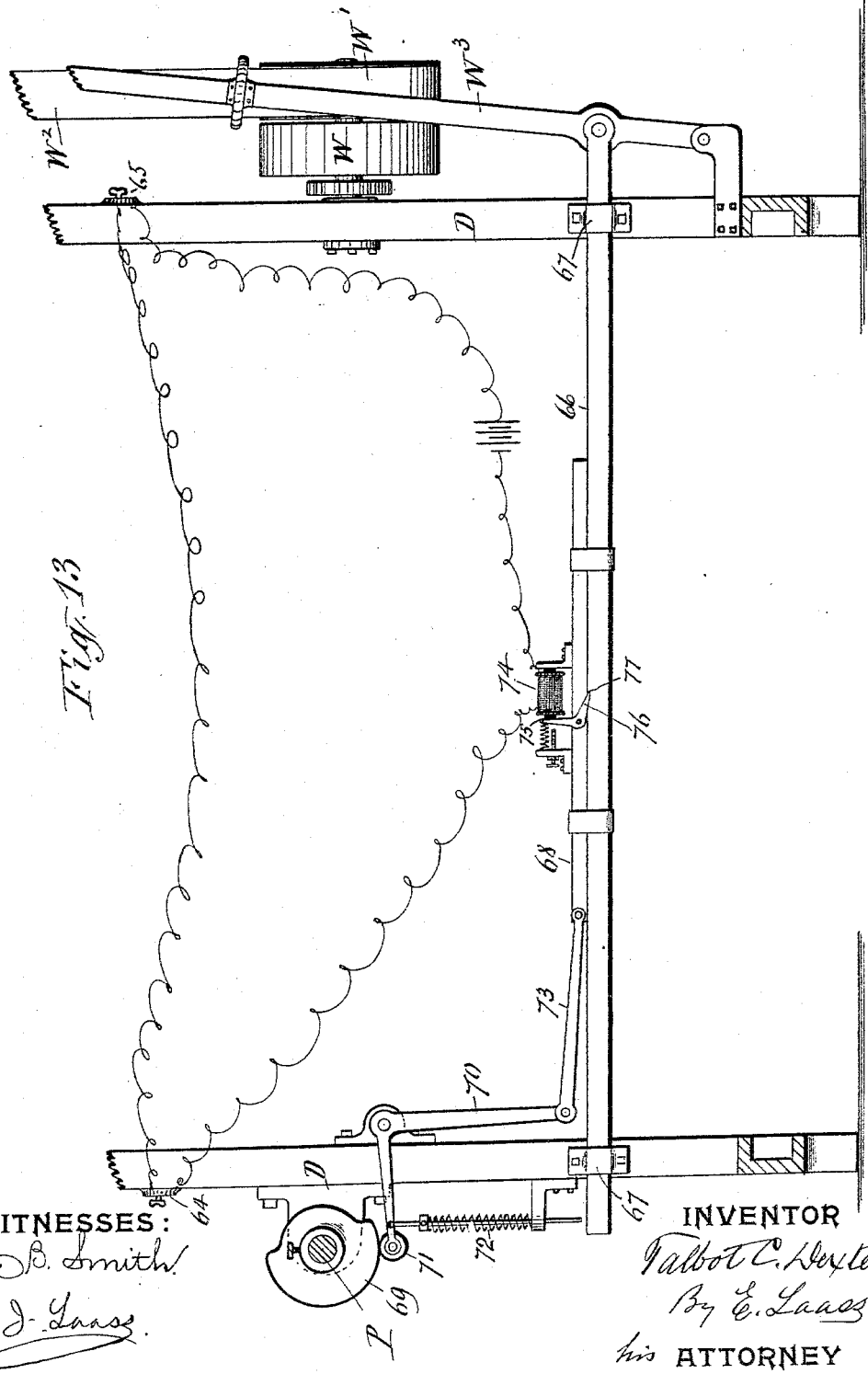

(No Model.) 22 Sheets—Sheet 14.
T. C. DEXTER.
PAPER ASSEMBLING AND STAPLING MACHINE.
No. 602,816. Patented Apr. 19, 1898.
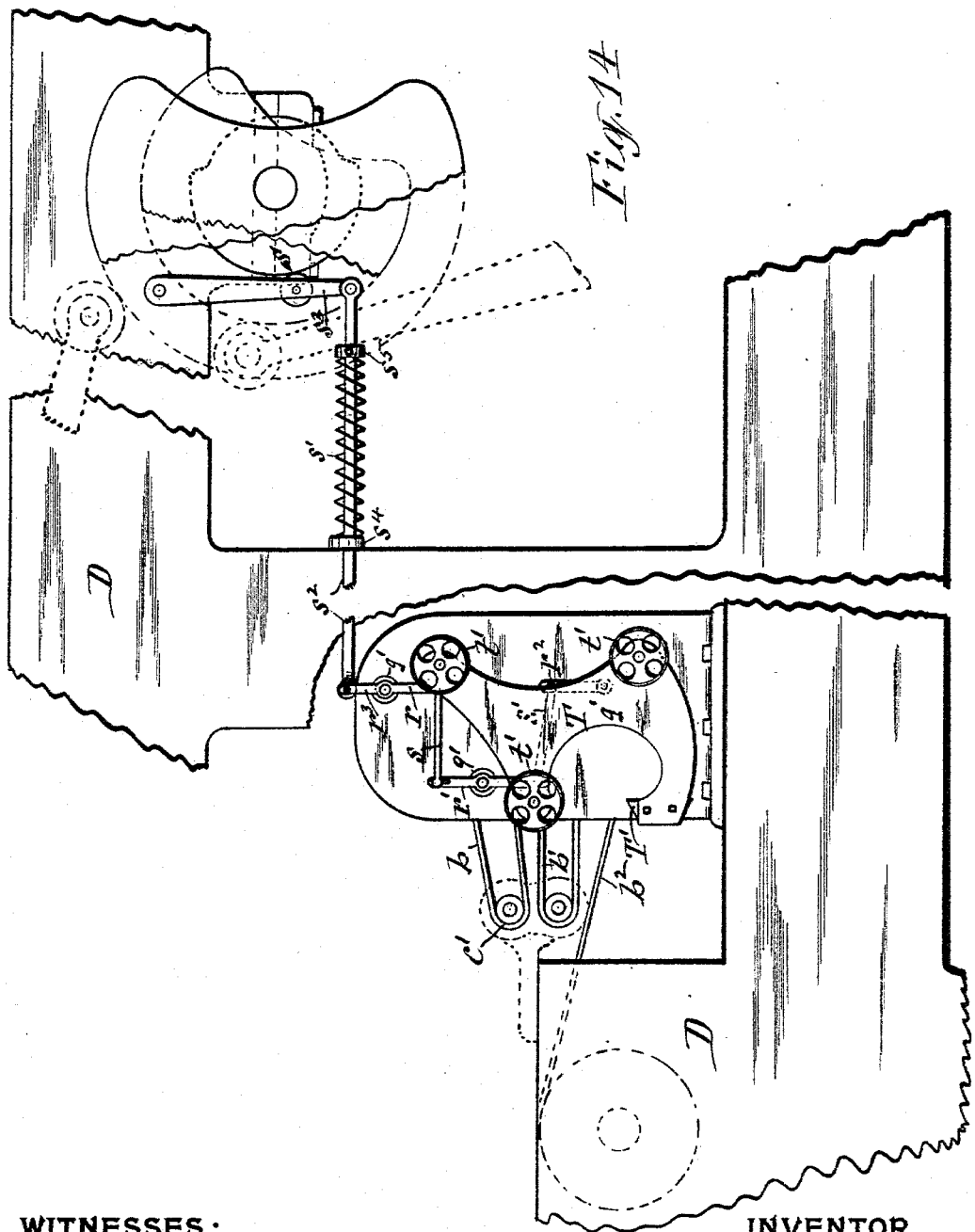
WITNESSES:
H. B. Smith
J. J. Laass
INVENTOR
Talbot C. Dexter
By E. Laass
his ATTORNEY

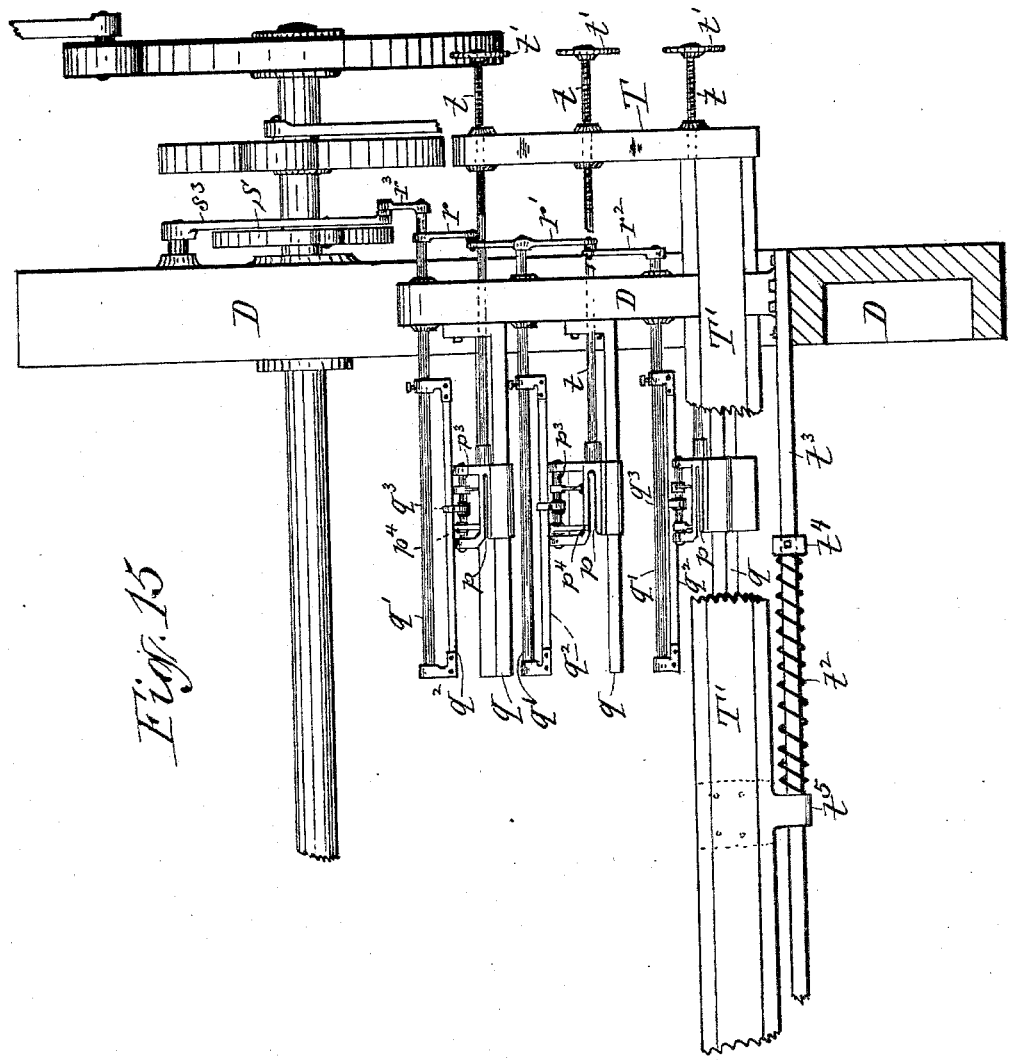

(No Model.) 22 Sheets—Sheet 16.
T. C. DEXTER.
PAPER ASSEMBLING AND STAPLING MACHINE.
No. 602,816. Patented Apr. 19, 1898.
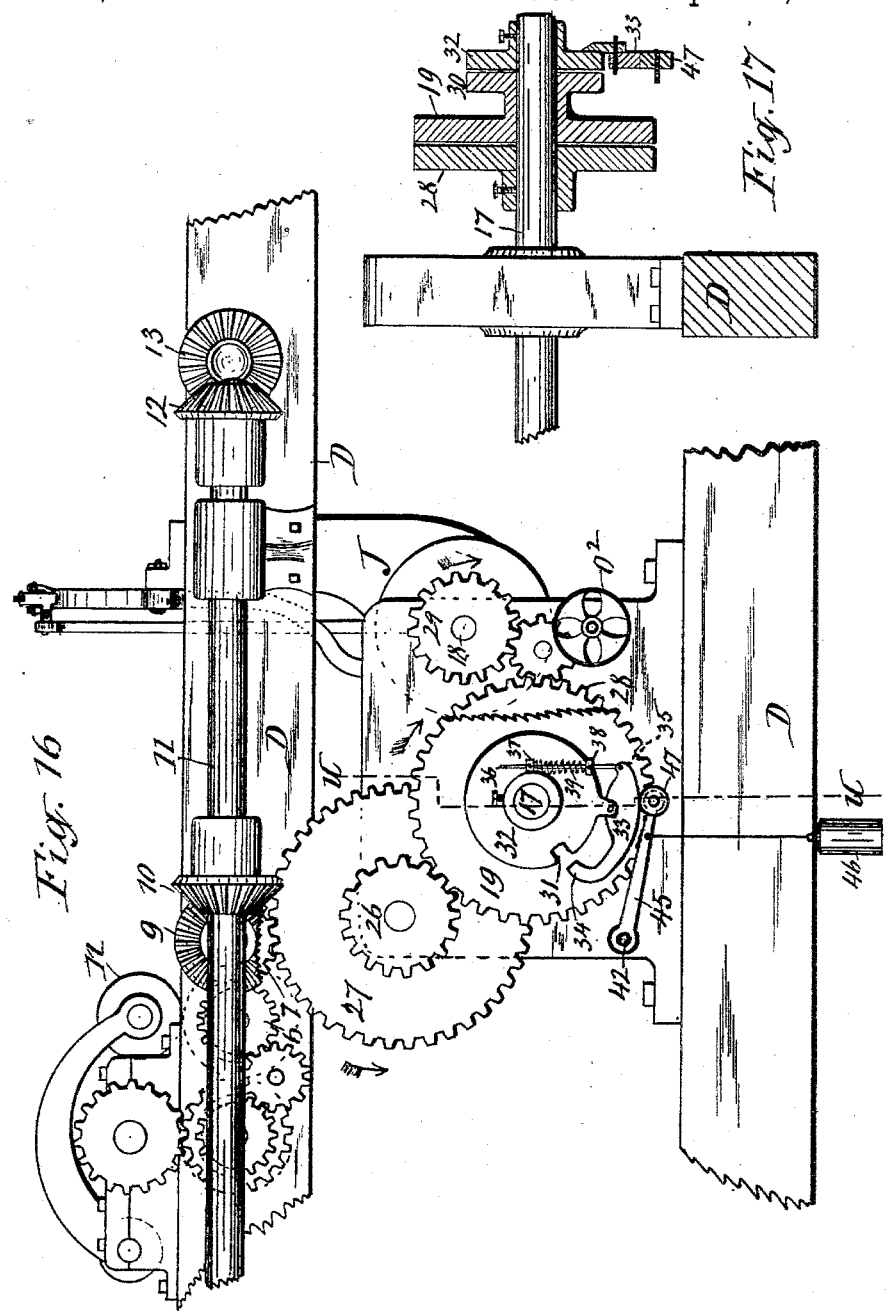
WITNESSES:
H. B. Smith
J. J. Laass
INVENTOR
Talbot C. Dexter
By E. Laass
his ATTORNEY

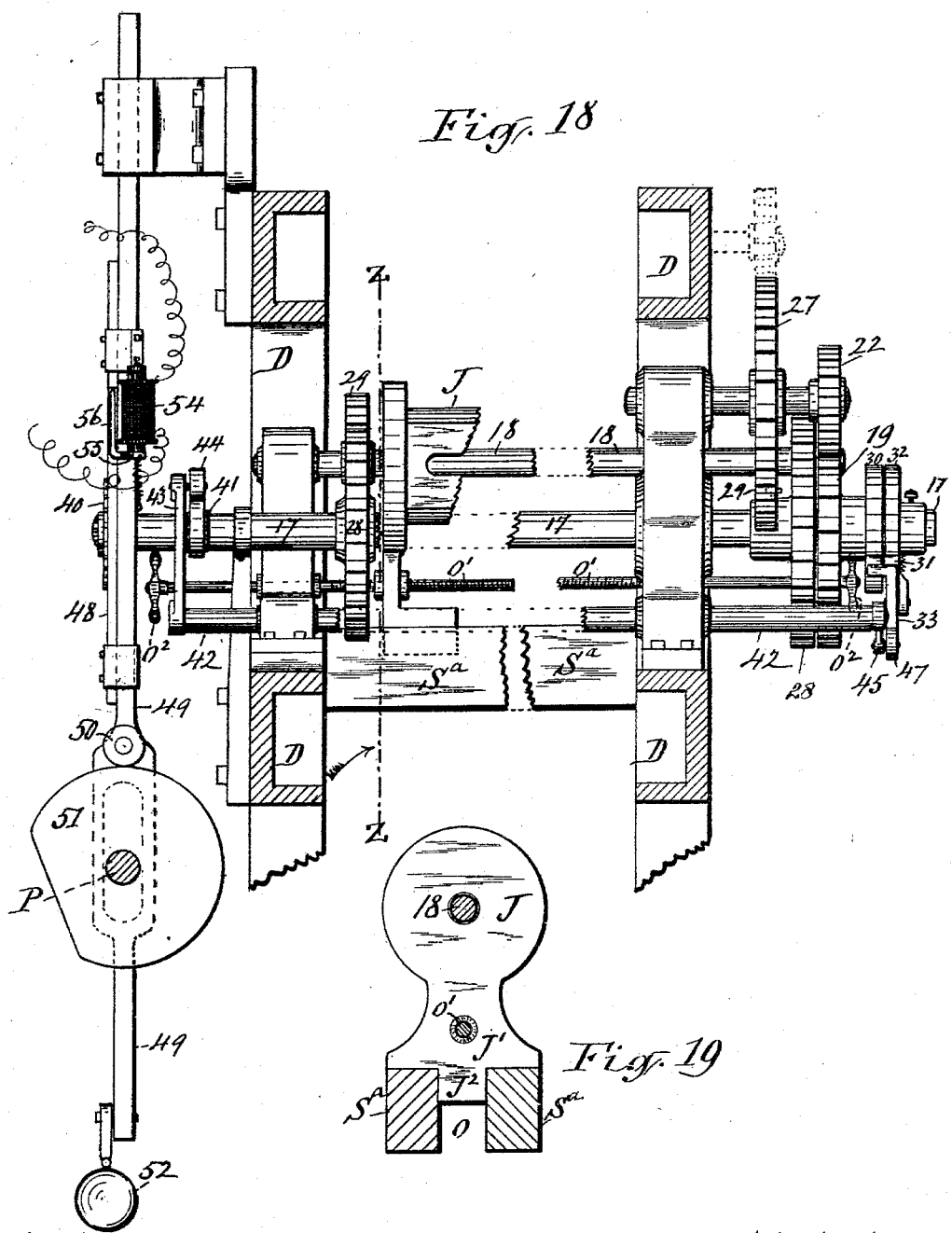

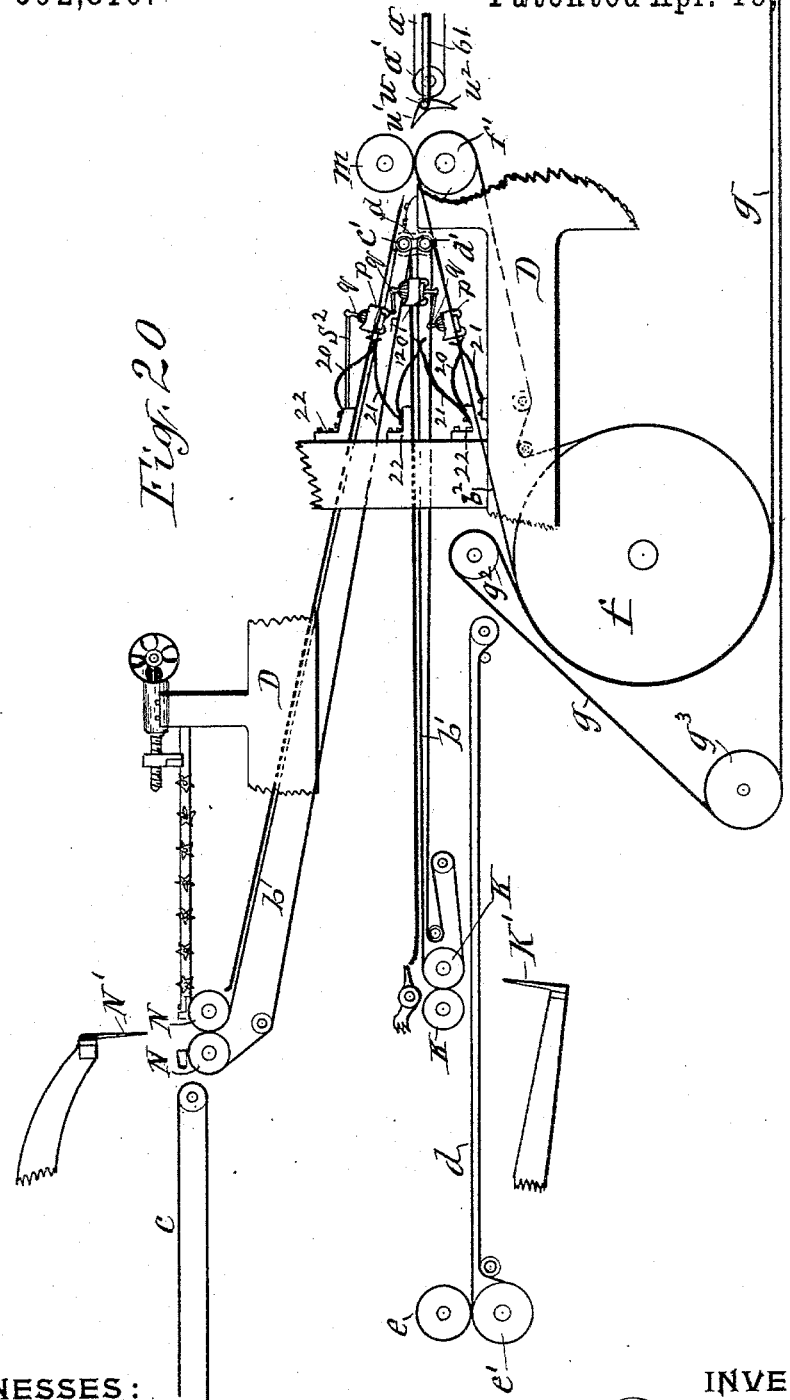

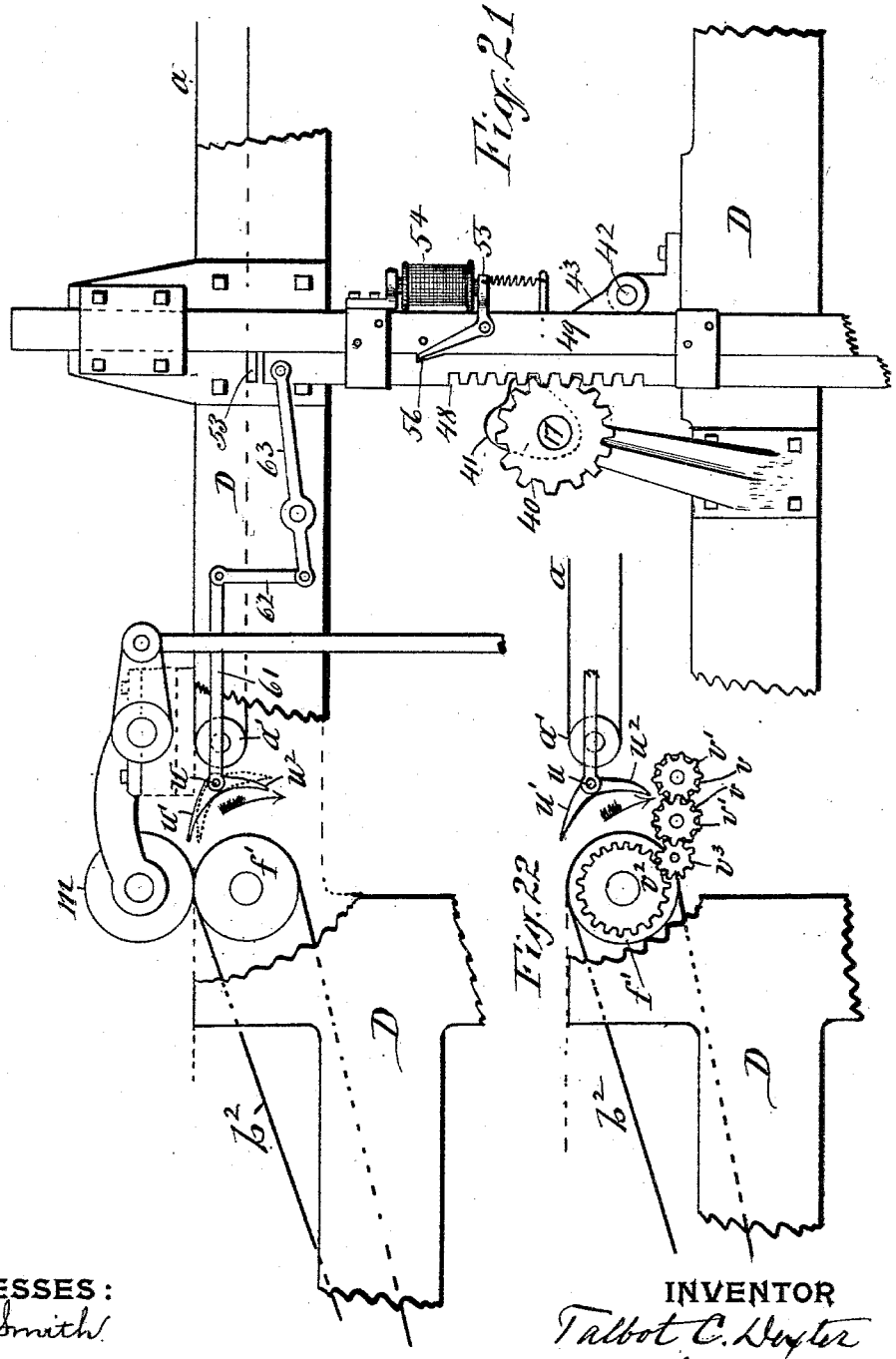

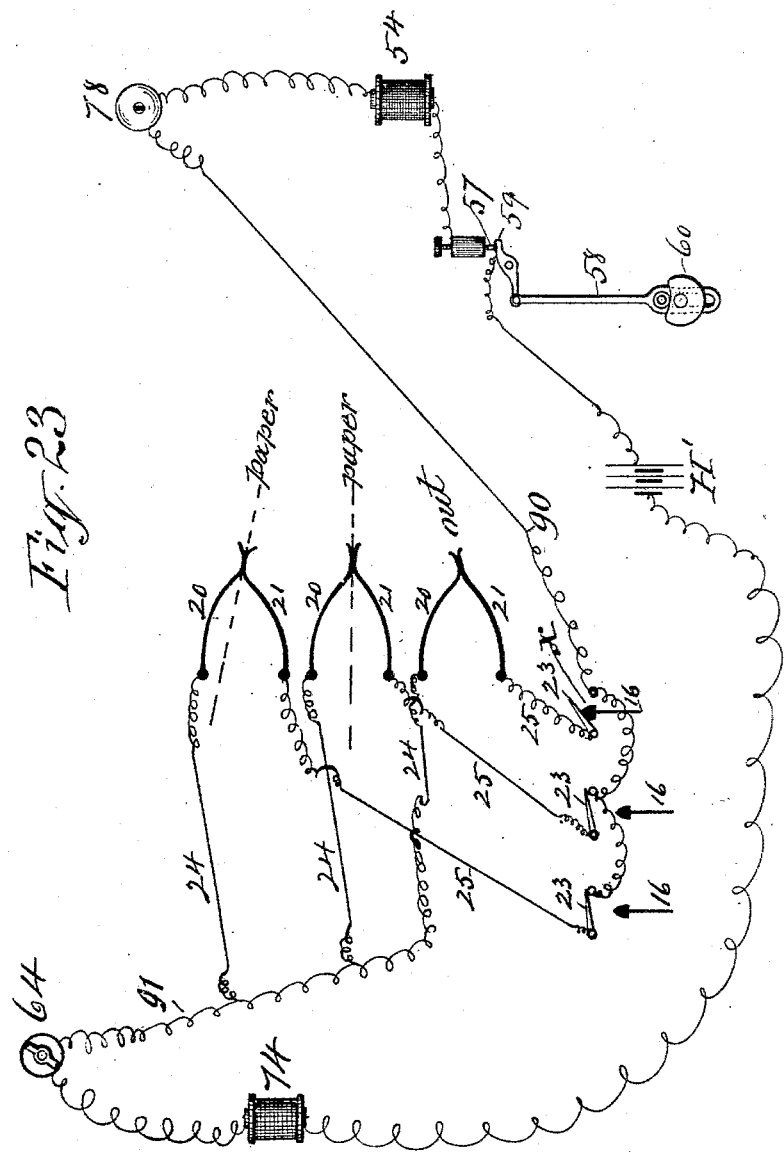

(No Model.) 22 Sheets—Sheet 21.
T. C. DEXTER.
PAPER ASSEMBLING AND STAPLING MACHINE.
No. 602,816. Patented Apr. 19, 1898.
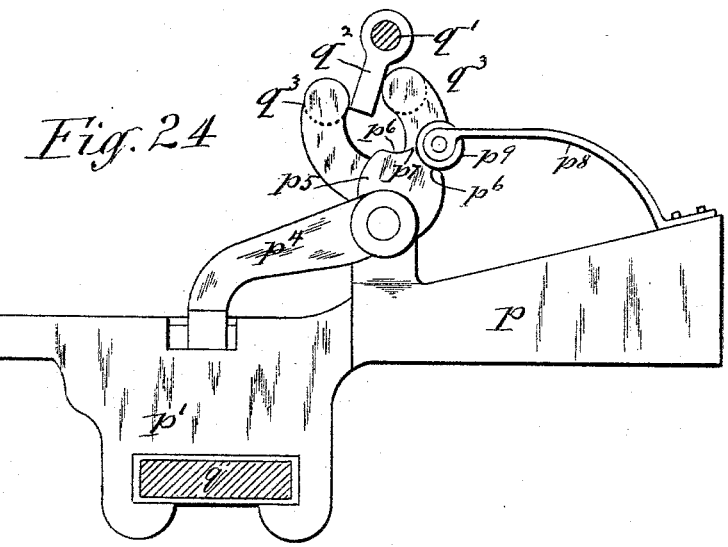
Fig. 24
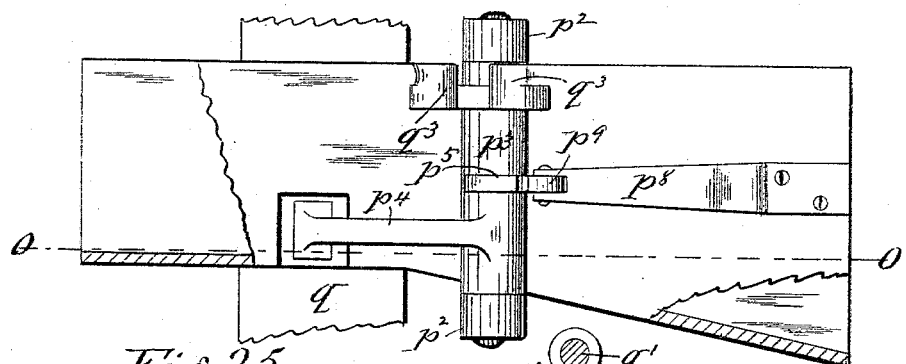
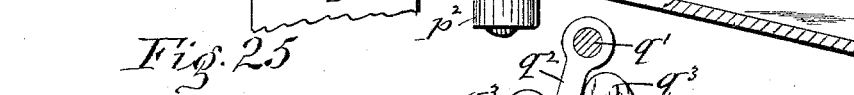
Fig. 25
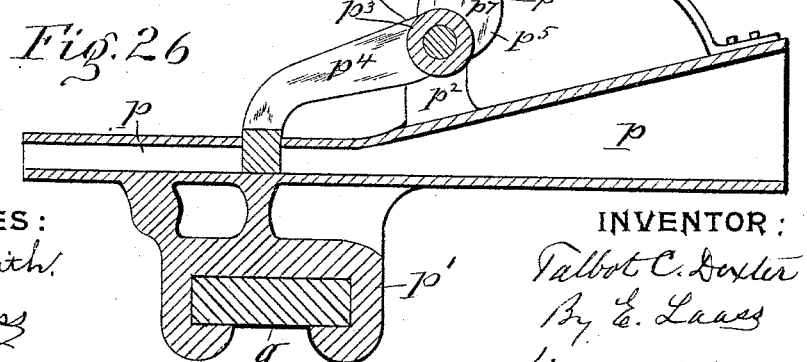
Fig. 26
WITNESSES:
H. B. Smith
J. J. Laass
INVENTOR:
Talbot C. Dexter
By E. Laass
his ATTORNEY (No Model.)  22 Sheets—Sheet 22.

T. C. DEXTER.
PAPER ASSEMBLING AND STAPLING MACHINE.

No. 602,816.  Patented Apr. 19, 1898.

WITNESSES:  INVENTOR

UNITED STATES PATENT OFFICE.

TALBOT C. DEXTER, OF PEARL RIVER, NEW YORK.

PAPER ASSEMBLING AND STAPLING MACHINE.

SPECIFICATION forming part of Letters Patent No. 602,816, dated April 19, 1898.

Application filed February 20, 1897. Serial No. 624,465. (No model.)

*To all whom it may concern:*

Be it known that I, TALBOT C. DEXTER, of Pearl River, in the county of Rockland, in the State of New York, have invented new and useful Improvements in Paper Assembling and Stapling Machines, of which the following, taken in connection with the accompanying drawings, is a full, clear, and exact description.

This invention relates to the class of machines which are designed to assemble, fold, and tie together a plurality of sheets constituting a periodical or a pamphlet; and it relates more particularly in many respects to the machine shown in my prior application for Letters Patent, Serial No. 540,698, filed March 6, 1895.

The chief object of my present invention is to equip the machine with means for automatically controlling the operation thereof, so as to cause it to stop in case of accidental defects in the performance of the functions of the devices employed for feeding the paper to the stitching or stapling machine. Said automatic control of the machine obviates the danger of injuring the mechanisms and interfering with the proper operation of the machine and also prevents the mixing of imperfectly stitched or stapled sheets with those which are delivered in requisite proper condition from the machine; and the object of the invention also is to render the machine more efficient and more reliable generally in its operation; and to that end the invention consists in the novel construction and combination of parts hereinafter described, and summed up in the claims.

Figure 2:
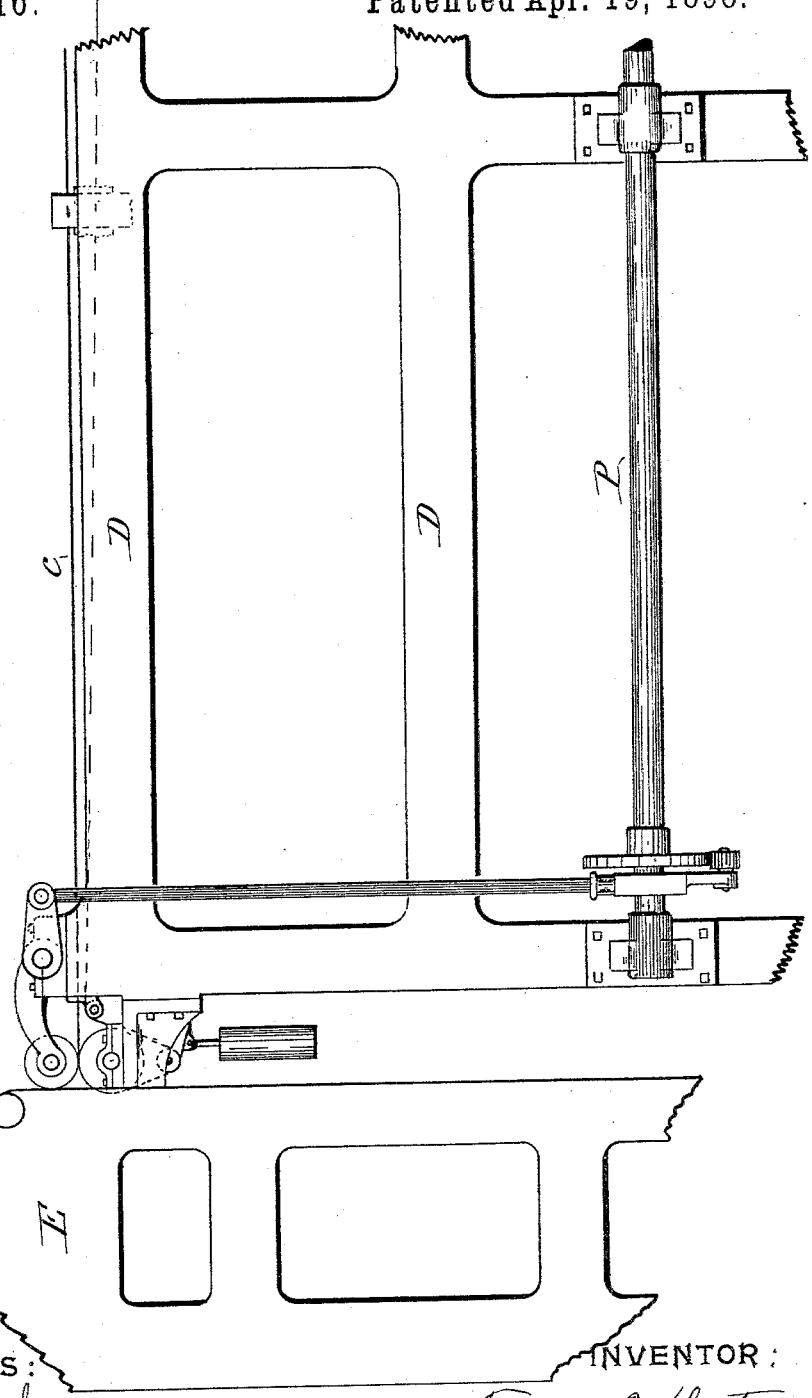
Figure 3:
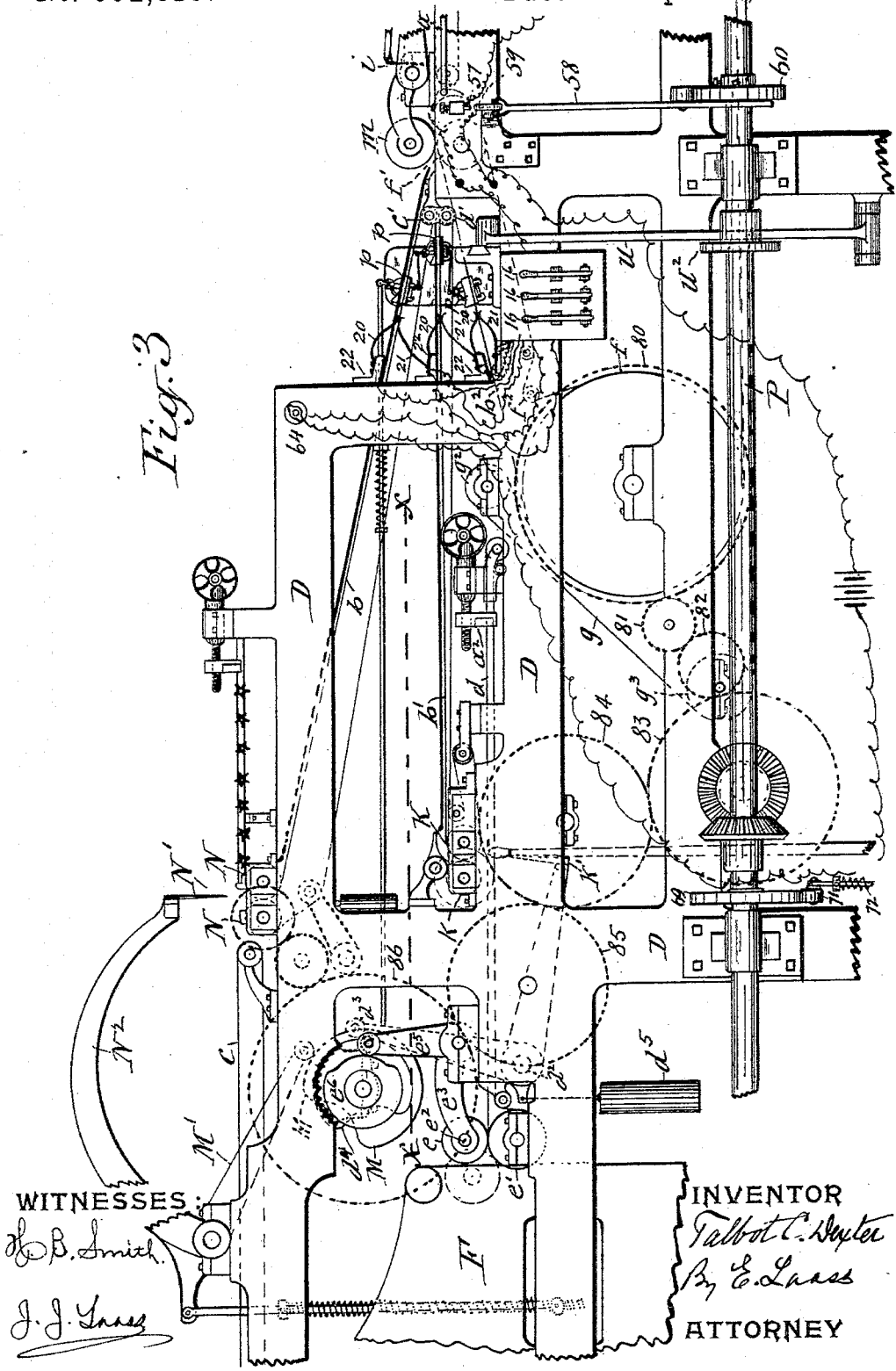
Figure 4:
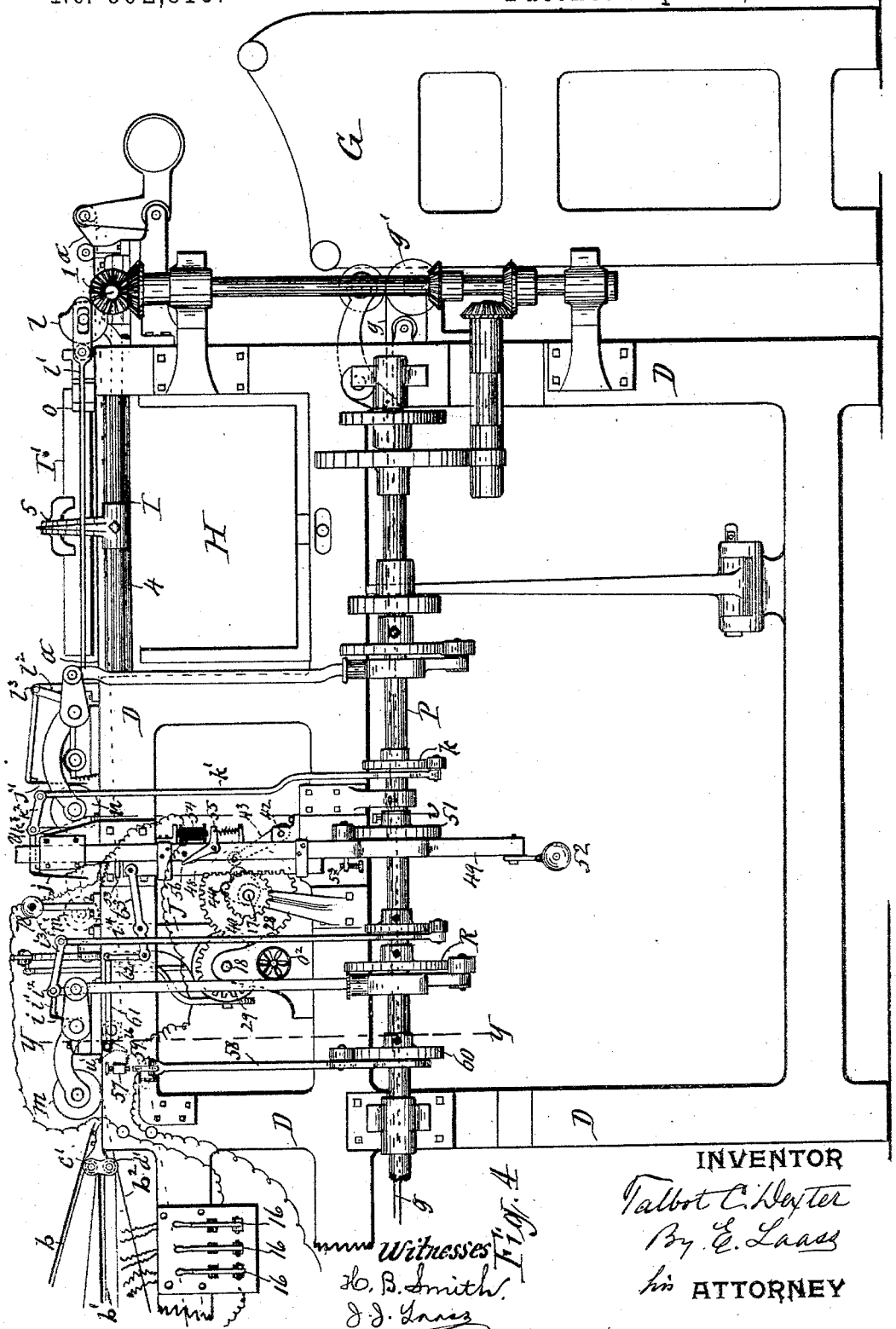
Figure 5:
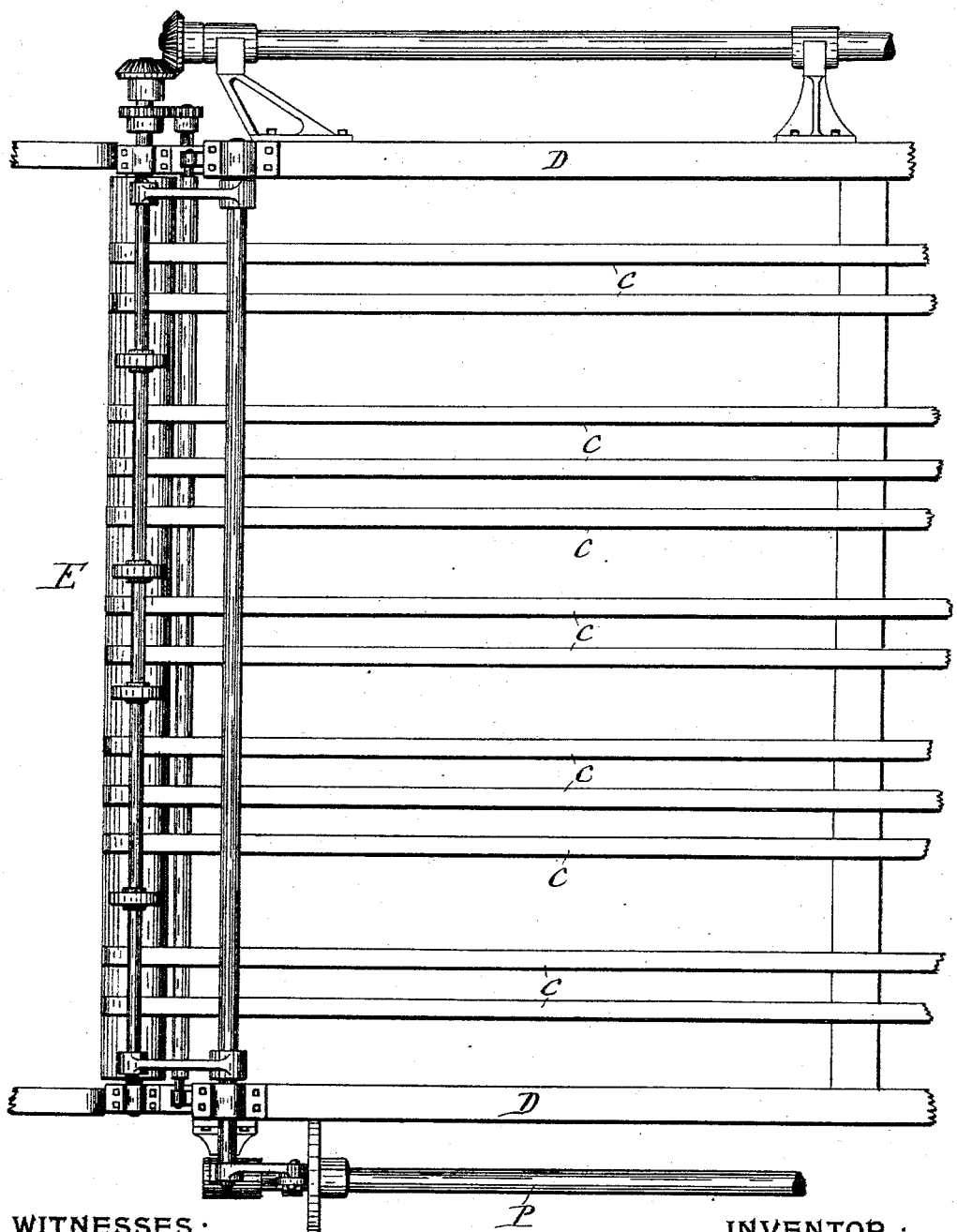
Figure 6:
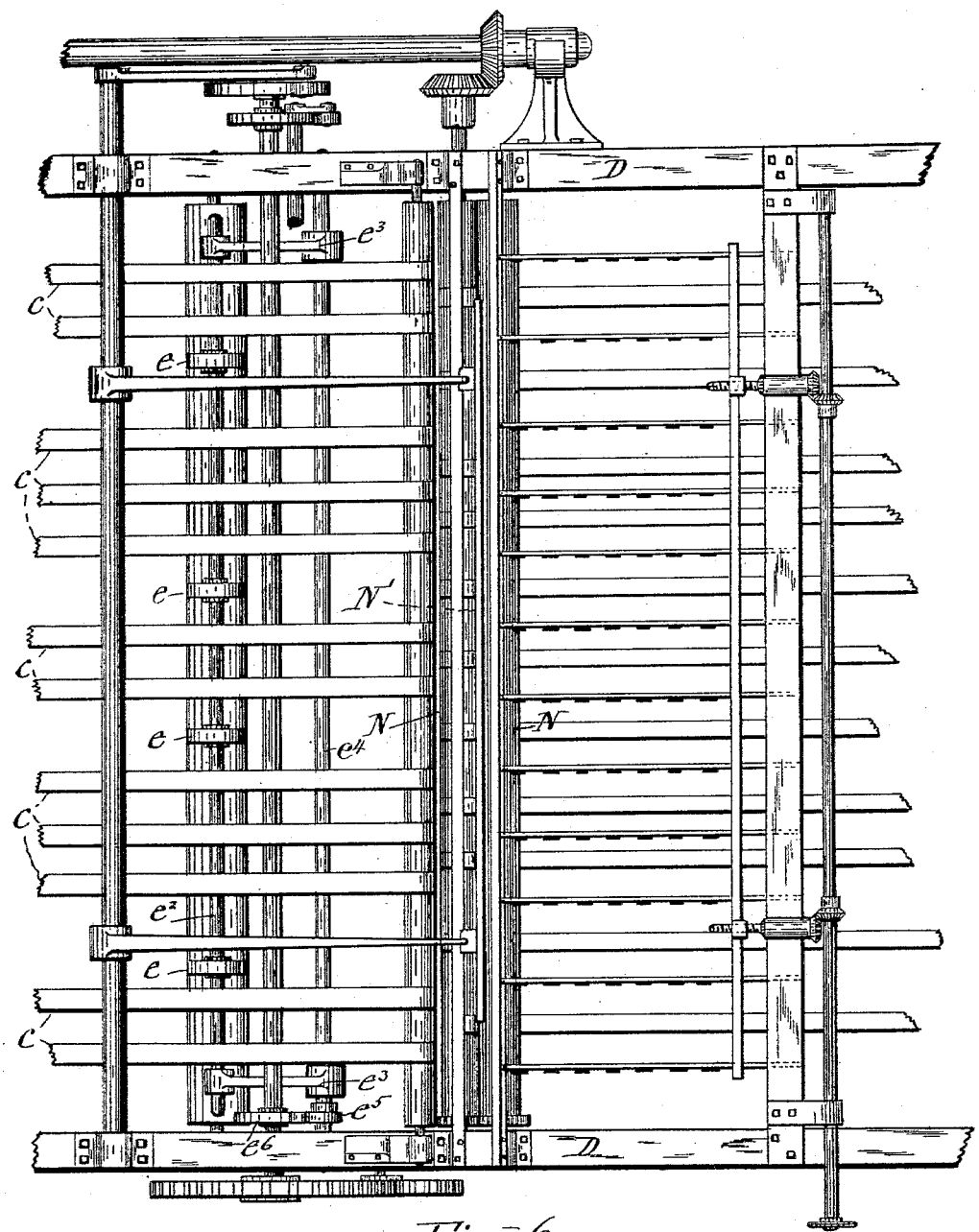
Figure 7:
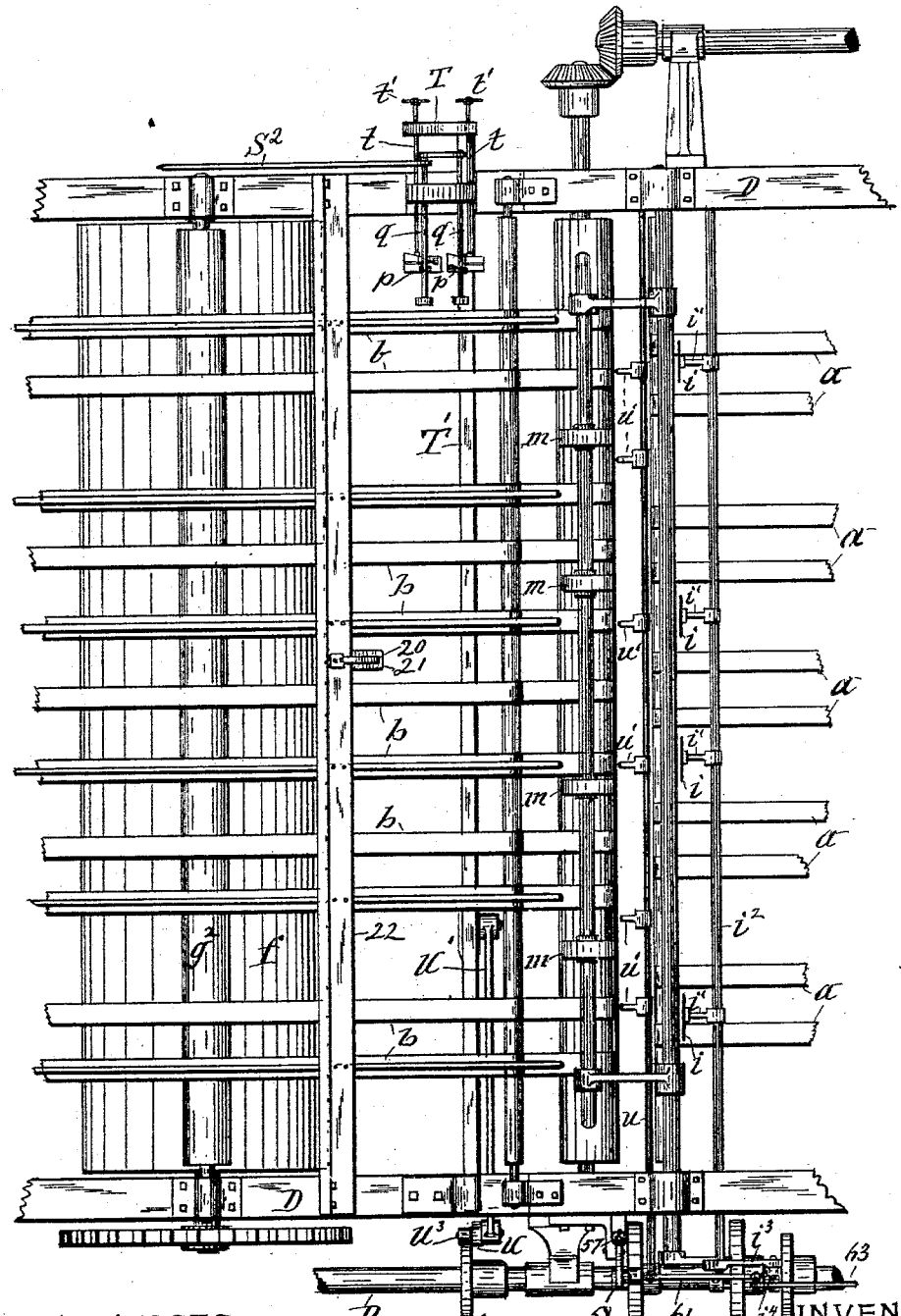
Figure 8:
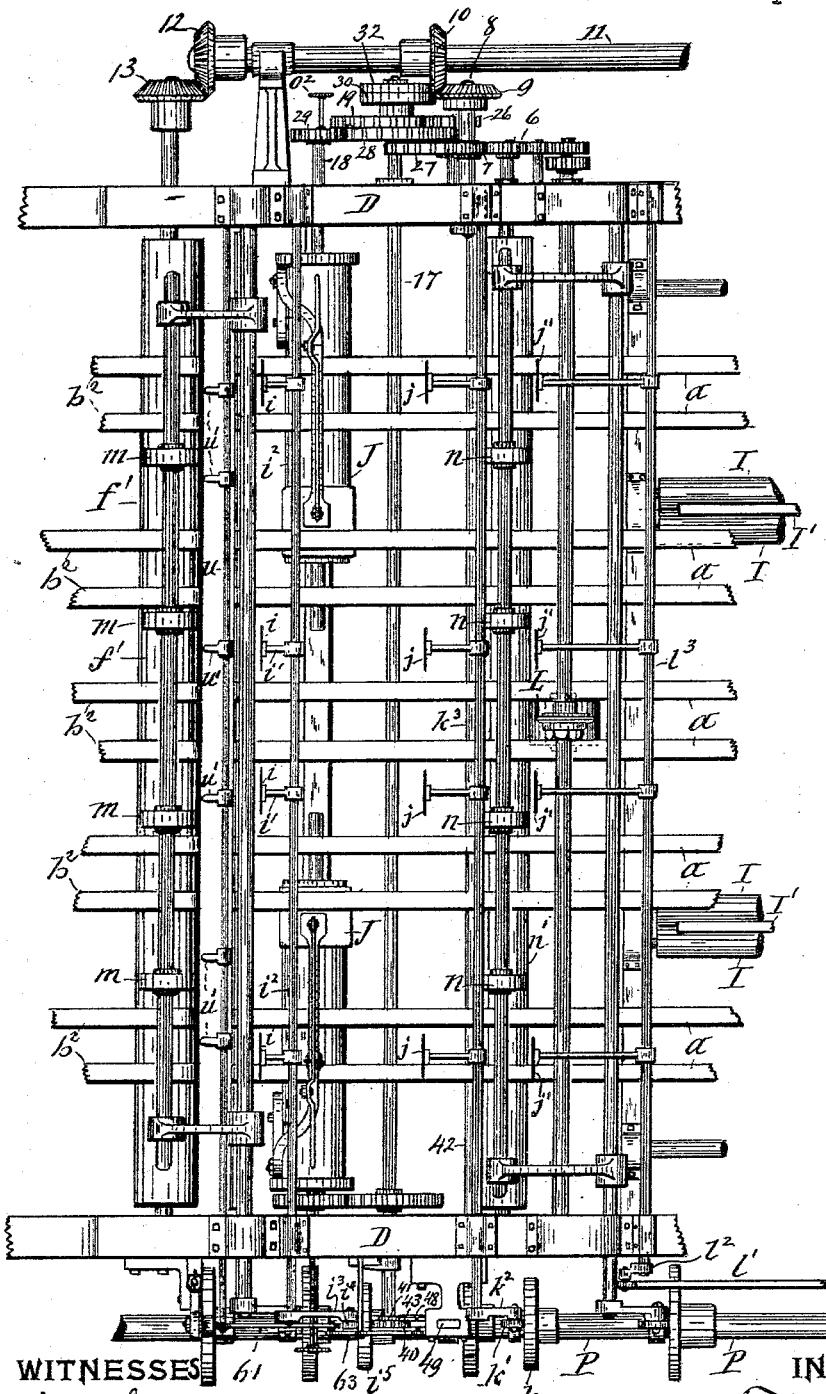
Figure 9:
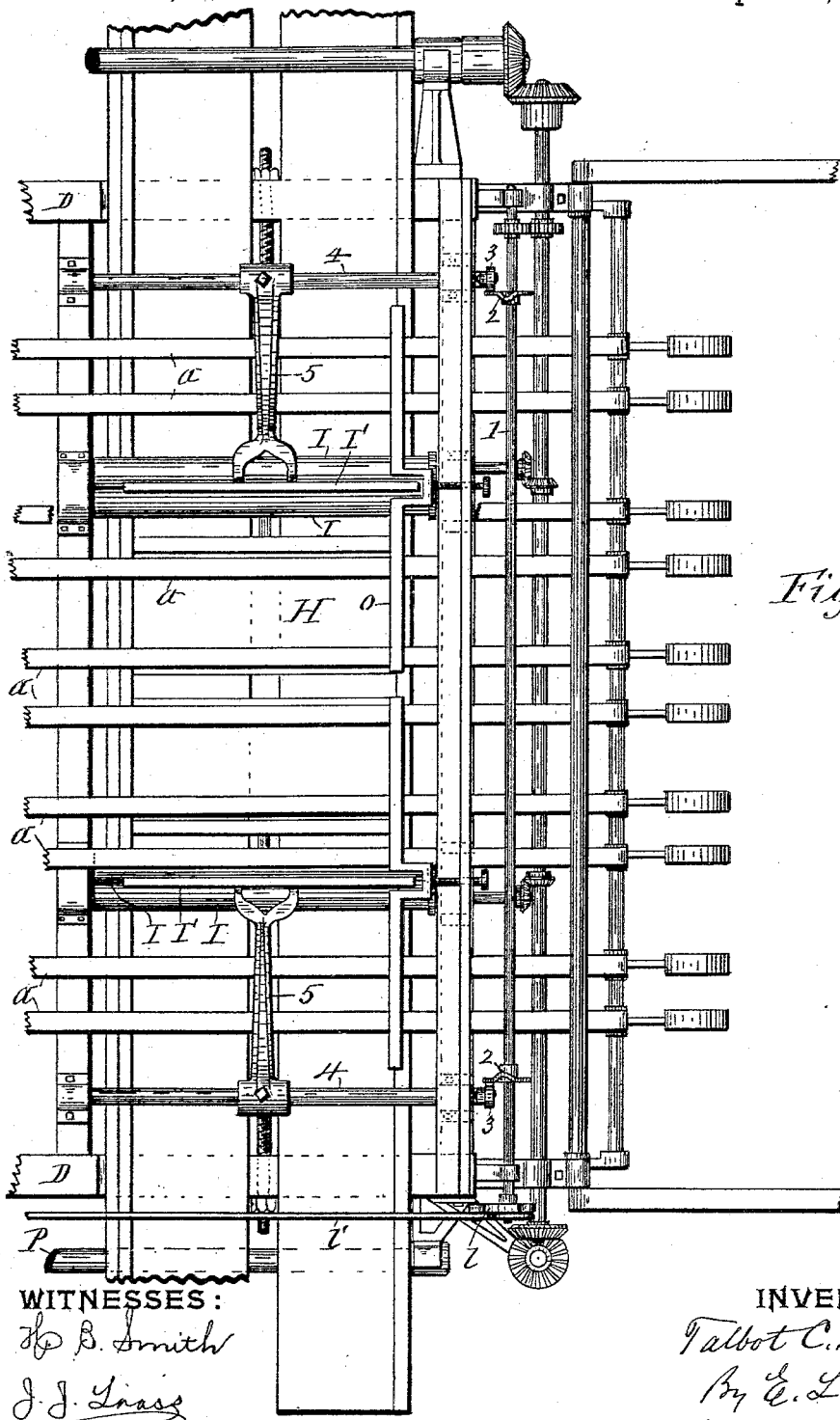
Figure 10:
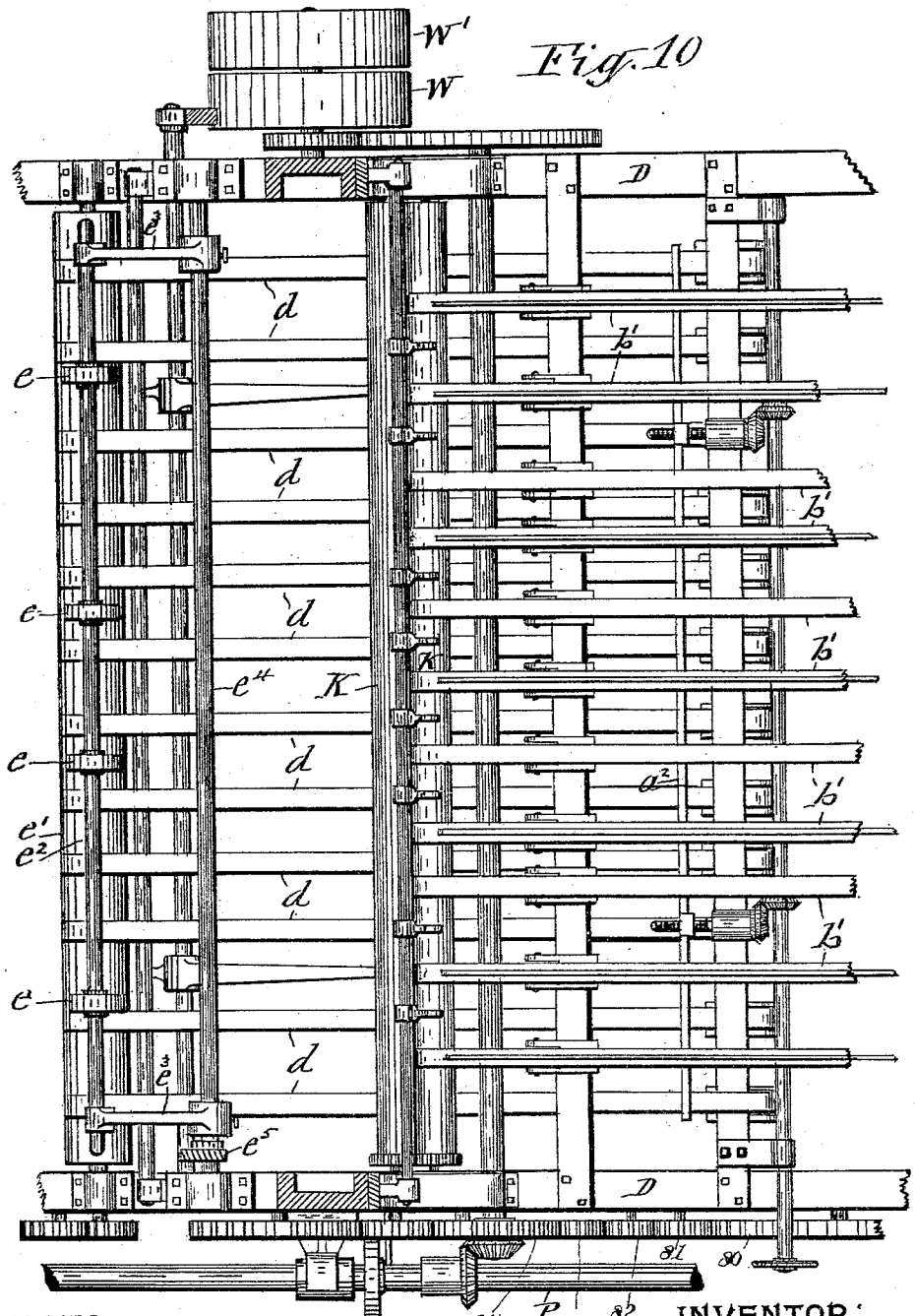
Figure 11:
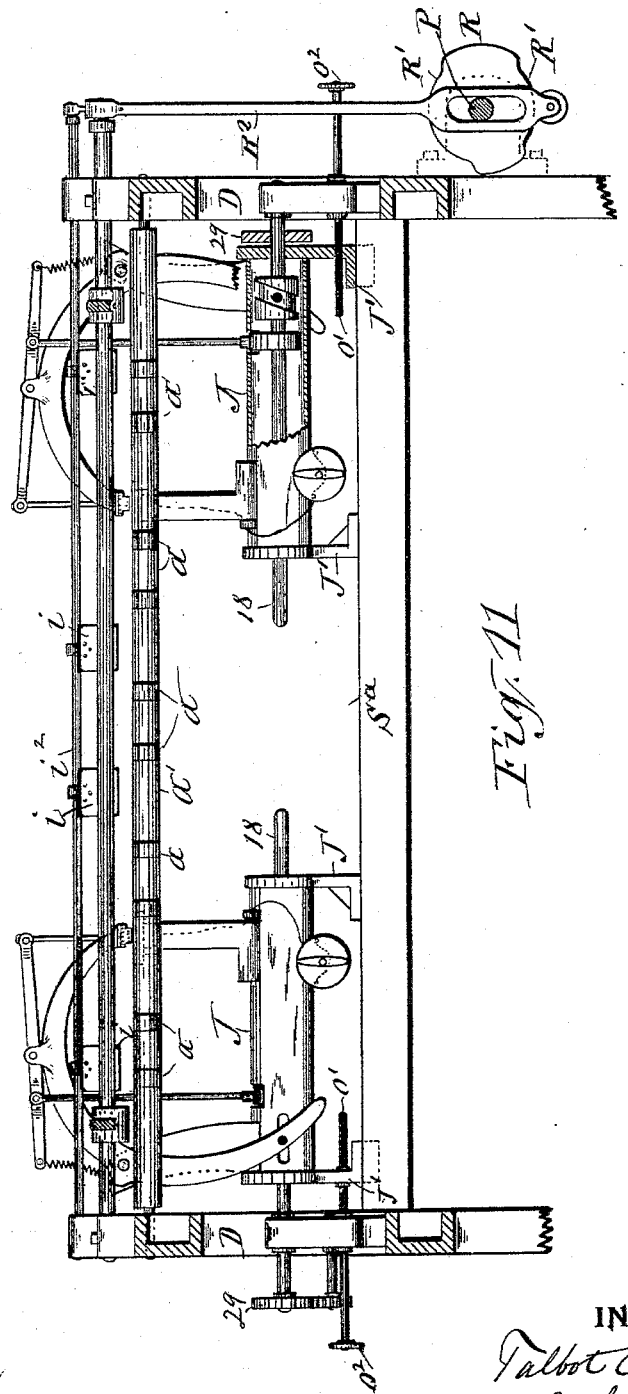
Figure 12:
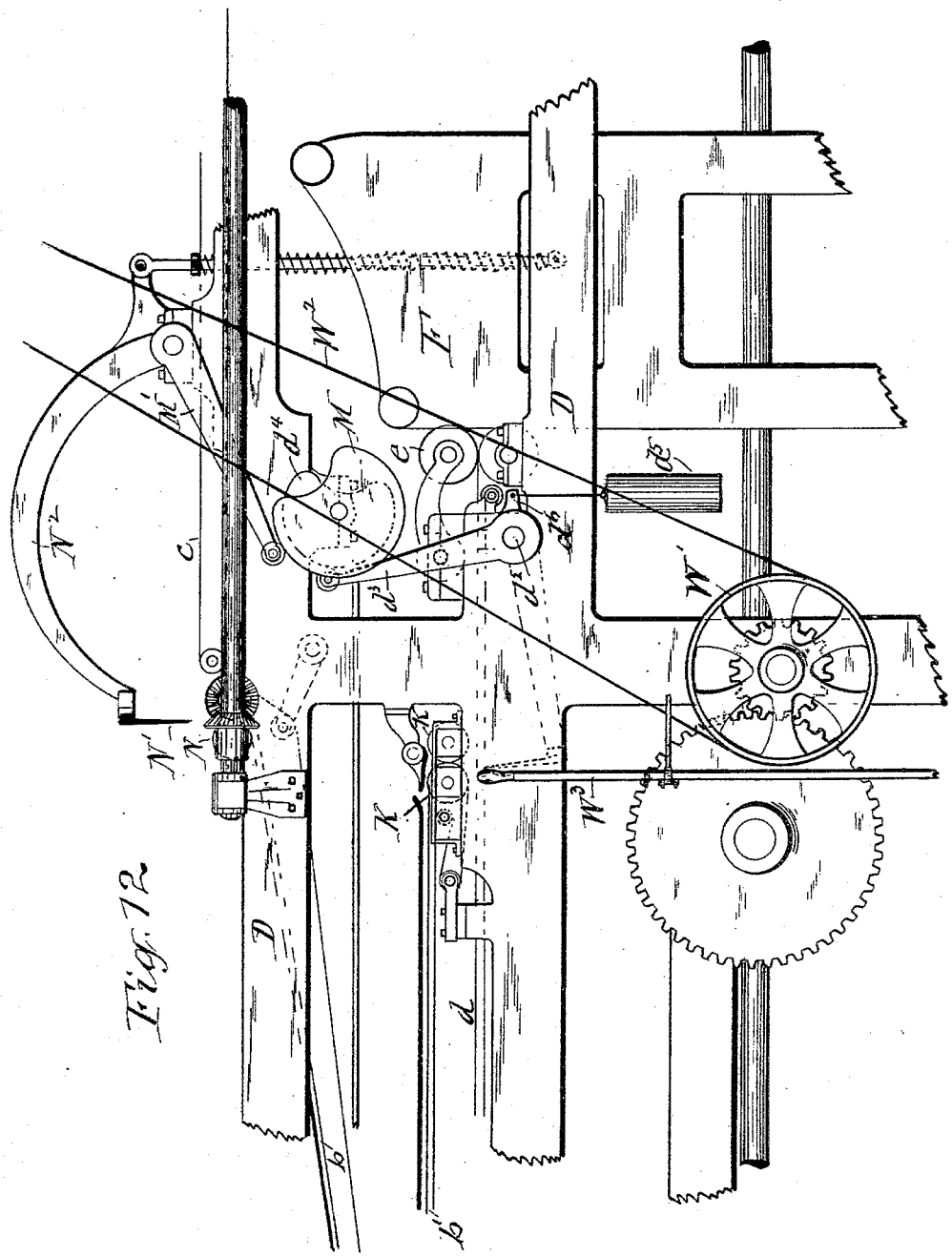
Figure 27:
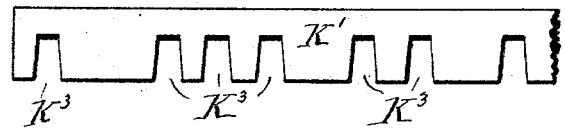
Figure 28:
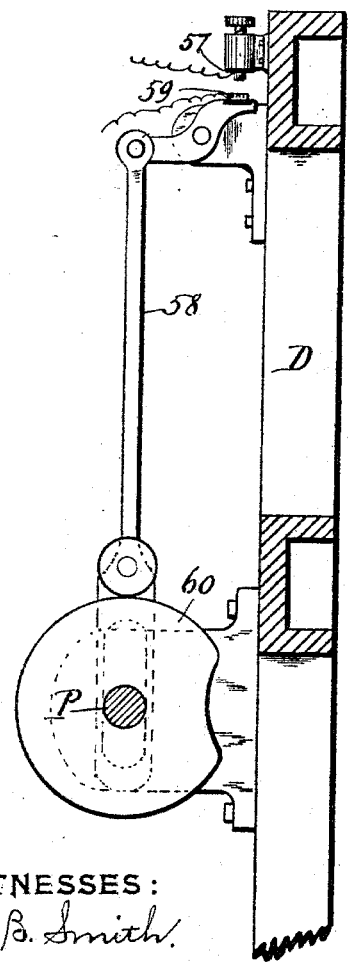
Figure 29:
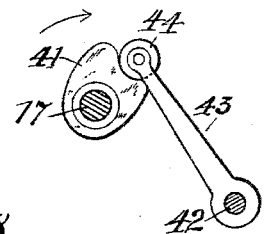

In the annexed drawings, Figure 1 is a side elevation of a machine embodying my invention. The main driving-gears are merely indicated by dotted lines to obviate obstructions to views of other more important parts of the machine. Figs. 2, 3, and 4 are enlarged side views of the successive sections of the machine, (indicated at A, B, and C in Fig. 1 of the drawings.) Fig. 5 is a plan view of said section A. Fig. 6 is a plan view of the portion of section B adjacent to section A. Fig. 7 is a plan view of the remainder of said section. Fig. 8 is a plan view of the portion of section C adjacent to section B. Fig. 9 is a plan view of the remainder of said section C. Fig. 10 is a plan view of the portion lying beneath the plane indicated by the dotted line X X in Fig. 3. Fig. 11 is a vertical transverse section on line Y Y in Fig. 4. Fig. 12 is a view of that side of the portion of the machine at which the main driving-pulley is located. Fig. 13 is a vertical transverse section of the portion of the machine to which the automatic belt-shifter is connected. Fig. 14 is an enlarged side view of the mechanism which actuates the paper-registering grippers. Fig. 15 is a front view of the same. Fig. 16 is an enlarged side view of the mechanism which transmits motion to the stitching-machine. Fig. 17 is a vertical transverse section on line U U in Fig. 16. Fig. 18 is an enlarged vertical transverse section on line V V in Fig. 4, the central portion of the machine being broken away. Fig. 19 is a transverse section on line Z Z in Fig. 18. Fig. 20 is a diagrammatic vertical sectional view of the tributary sheet-carrying tapes, showing their relative positions. Fig. 21 is an enlarged vertical sectional view of the switch for diverting misfed sheets from the stitching-machine. Fig. 22 illustrates a modification of said switch. Fig. 23 is a diagrammatic view of the electric circuits. Figs. 24 and 25 are enlarged side and plan views, respectively, of one of the paper-registering grippers, viewed in the direction of the arrow at the top of Fig. 7. Fig. 26 is a vertical longitudinal section on line O O in Fig. 25. Fig. 27 is a partial face view of the folding-blade of the insert-sheet folder. Fig. 28 is an enlarged view of the intermediate circuit maker and breaker, and Fig. 29 is a face view of the cam which throws the stitching-machines out of gear.

D represents the main supporting-frame of the machine.

E F G designate paper-feeding machines designed to supply, respectively, the main sheet, the insert-sheet, and the covering-sheet designed to be tied together by means of wire stitches or staples and to be delivered in properly-folded pamphlet form into a suitable packing-box H, which is connected to and operated by said machine and may be of any suitable and well-known construction, the details of which are immaterial to my present invention, and therefore need no special description.

$a\ a$ represent the main tapes, which convey the sheets to folding-rollers I I, which are disposed across the top of the packing-box and deliver the folded sheets into said box.

$I'\ I'$ denote the oscillatory blades, which introduce the paper between said folding-rollers in the usual manner. Various means may be employed for imparting the requisite motions to said folding-blades. The actuating devices of the same (shown more clearly in Fig. 9 of the drawings) consist of cams 2 2, attached to a rotary shaft 1 and bearing on the free ends of arms 3 3, attached to the shaft 4 4, to which the blade-carrying arms 5 5 are secured.

The machine is designed to stitch or staple sheets each of which contains two signatures and to sever said signatures and fold and deliver them into the aforesaid packing-box. For this purpose there are two wire stitching or stapling machines J J, disposed in a line at right angles to the tapes $a\ a$ and at opposite sides of and equidistant from the longitudinal central line of travel of the set of tapes. Said stitching or stapling machines may be of any suitable and well-known construction capable of properly tying together the component sheets by means of wire staples or analogous fastening or binding devices. In the path of the tapes $a\ a$ from the stitching-machines to the folding-rollers I I is the rotary cutter L, arranged in a line passing midway between the stitching or stapling machines to sever the united duplicate sheets, which are thence conveyed by the tapes $a\ a$ to the two pairs of folding-rollers $I'\ I'$, which fold said duplicates separately and deliver them to the packing-box.

$b$, $b'$, and $b^2$ designate the tributary paper-conveying tapes which deliver the component sheets to the receiving ends of the main tapes $a\ a$. The main sheet is first carried from the feeding-machine E by means of tapes $c$ to folding-rollers N N, from whence the tributary tapes $b$ run to a return carrying-roller $c'$, adjacent to the receiving ends of the main tapes $a$. By means of the folding-blade $N'$ the main sheet is tucked into the bite of the rollers N N, which fold the sheet in its passage to the tributary tapes $b$. Said rollers are geared to rotate with the upper portions toward each other in the usual manner to cause them to draw the paper down between them. The means for operating the folding-blade $N'$ are more fully shown in Fig. 12 of the drawings and consist of the rotary cam M and the arm $M'$, which latter is fastened to the same shaft to which is attached the arm $N^2$, carrying the folding-blade $N'$. The arm $M'$ is made to ride by gravity on the cam M, which imparts oscillatory motion to said arm and a corresponding motion to the arm $N^2$ of the folding-blade.

The insert-sheet is carried from the feeding-machine F by means of tapes $d$, extending part way under the tributary tapes $b'$, which latter run from folding-rollers K K, located over the tapes $d$, to a return carrying-roller $d'$, as more clearly shown in Fig. 20 of the drawings.

A gage $a^2$ is arranged over the tapes $d\ d$ a proper distance beyond the folding-rollers K K to arrest the movement of the insert-sheet, so as to cause it to lie with its central portion under said folding-rollers. Beneath the said rollers is the oscillatory folding-blade $K'$, which tucks the supplemental sheet into the bite of the rollers K K, whereby said sheet is folded and thence carried to the receiving ends of the main tapes $a\ a$ by the tapes $b'\ b'$. Said folding-blade is formed with deep notches $K^3$, as shown in Fig. 27, for the passages of the tapes $d\ d$ during the upward thrust of the blade, which is attached to the free end of an arm $K^2$, attached to a rock-shaft $d^2$, which is actuated by an arm $d^3$, fixed to said shaft and held with its free end in contact with a rotary cam $d^4$ by means of a weight $d^5$, suspended from a projection on a hub $d^6$, attached to the rock-shaft $d^2$. Said projection is in opposite direction from that of the folding-blade $K'$ and serves to impart the upward thrust to the same. The downward movement of said blade is effected by the rotating cam $d^4$, acting on the arm $d^3$.

Referring to Fig. 3 of the drawings, $e\ e$ denote drop-rollers, which are directly over the tape-carrying roller $e'$, adjacent to the feeding-machine F, to press the insert-sheet issuing from said machine down into intimate contact with the tapes $d$ to cause the sheet to be positively carried along by said tapes. Said drop-rollers are mounted on a shaft $e^2$, which is carried on the free ends of arms $e^3$, attached to a rock-shaft, from which extends another arm $e^5$, bearing with its free end on a rotary cam $e^6$.

The tributary tapes $b^2$, which are to deliver the sheet designed to form the cover of the periodical or pamphlet, run from the top of a carrying-roller $f$, located beneath the plane of the tapes $b'$, to a carrying-roller $f'$, adjacent to the receiving ends of the main tapes $a$, and thence back over an idler $f^2$ and around the bottom portion of the roller $f$, as shown in Figs. 3 and 20 of the drawings. The cover-sheet is brought from the feeding-machine G to the tapes $b^2$ by means of the tapes $g$, running from the carrying-roller $g'$ at the delivery end of said feeding-machine around the bottom, rear, and upper portion of the roller $f$, thence over an idler $g^2$, down around the rear portion of another idler $g^3$, and back to the carrying-roller $g'$.

Over the receiving ends of the main tapes $a$ is the intermittently rising and falling gage $i$, which descends in time to cause the three sheets which are delivered from the tributary tapes $b$, $b'$, and $b^2$ to abut with their advance edges against said gage and thus arrest the movement of said sheets and assemble the same at said gage preparatory to advancing the sheets to the stitching or stapling machines J J. Said assembling-gage I preferably form of a plurality of plates secured vertically to arms $i'$, attached to a rock-shaft $i^2$, receiving oscillatory motion by means of an arm $i^3$, attached to the end of said shaft and coupled to a pitman $i^4$, which receives intermittent reciprocating motion from a rotary cam $i^5$, attached to one of the main driving-shafts P, extending along the side of the machine.

Each set of signatures and its accompanying cover are stitched or stapled in two successive places, and inasmuch as the sheets have to be held stationary during the process of applying the stitches or staples I provide in addition to the aforesaid assembling-gage two positively-actuated gages $j$ and $j'$, properly timed to fall in succession and at predetermined intervals into the path of the sheets to intercept the same by the abutment of the advance edges of said sheets against said gages. The mechanisms for transmitting motion to these gages respectively consist of rotary cams $k$ and $l$, imparting reciprocating motion to pitmen $k'$ and $l'$, which are connected to arms $k^2$ and $l^2$, attached to the ends of the shafts $k^3$ and $l^3$, from which extend the arms to which the gages are attached.

In order to impart positive advance movements to the sheets between and after their intervals of rest, as aforesaid, I employ the drop-rollers $m$ directly over the tape-carrying roller $f'$ at the receiving ends of the main tapes $a$ and drop-rollers $n$ over a tape-supporting roller $n'$, located beyond the stitching or stapling machine and preferably in front of and in proximity to the cutter L, as more clearly shown in Fig. 8 of the drawings, which supporting-roller is geared to rotate with its top in the direction in which the tapes travel. Said actuating-gear consists of the pinion 6, fastened to the shaft of the roller and meshing with a gear 7, attached to a pivoted stud 8, to which is also secured a miter-gear 9, engaging a corresponding gear 10 on a shaft 11, from which is also transmitted motion to the roller $f'$ by similar miter-gears 12 and 13, as shown in Figs. 8 and 16 of the drawings.

The drop-rollers $n$ propel the sheets after they have been stitched or stapled and serve to force the sheets under the cutter L, which severs the duplicate sheets or signatures and covers. The severed sheets are thence carried by the tapes $a$ to the end gage $o$, which arrests said sheets in proper positions over the two pairs of folding-rollers I I to be folded thereby and thence delivered into the packing-box H.

Inasmuch as the sheets have to receive the successive stitches or staples and the requisite forward impulses, as aforesaid, before said sheets arrive under the drop-rollers $n$, I either provide mechanism to impart properly-timed successive drops to the drop-rollers $m$ over the roller $f'$ or employ an additional set of drop-rollers $m'$ between the drop-rollers $m$ and $n$, as indicated by dotted lines in Fig. 4 of the drawings, in which latter case the rollers $m$ are given a single drop, succeeded by a drop of the second rollers $m'$. When it is desired to dispense with the additional drop-rollers $m'$, the cam R, which actuates the drop-rollers $m$, is to be formed with two depressions R' R' in its periphery, as shown in Fig. 11 of the drawings. A pitman R² receives reciprocating motion from said cam and imparts a rocking motion to the shaft, which has attached to it the rock-arms of the drop-rollers.

In order to permit the stitching or stapling machines J J to be adjusted to operate on sheets of different widths, I mount said machines on their supports adjustably along lines at right angles to the tapes $a$ $a$ or toward and from the longitudinal central line of the travel of said tapes. The supports for said machines I preferably form of two beams $S^a$ $S^a$, extending across the entire machine and secured to the sides of the main frame D. Said beams are placed parallel side by side, with a space between them to form a guideway $o$, as shown in Fig. 19 of the drawings. The base of each of the machines J has affixed to it saddles or brackets J' J', which ride on the beams $S^a$ $S^a$, and are formed with tongues $J^2 J^2$, which enter into the guideway $o$. Said machines can be shifted lengthwise of the beams and are guided in said movement by the tongues $J^2$, sliding in the guideway $o$. Any suitable means may be employed to secure the said stitching or stapling machines in their adjusted positions. I prefer, however, to accomplish both the shifting of said machines to their desired positions and the retaining of the same in said positions by means of screws $o'$ $o'$, which are parallel with the beams $S^a$ $S^a$, and are journaled in the sides of the main frame D and work in screw-threaded eyes in the adjacent saddles J', as shown in Fig. 11 of the drawings. The outer ends of the said screws are provided with hand-wheels $o^2$, by which to turn said screws in the operation of adjusting the machines J J in their positions, as aforesaid.

To properly register and aline the component sheets preparatory to passing them to the stitching or stapling machines, I place in the plane of each of the aforesaid tributary tapes suitable mechanism for shifting the sheets laterally toward the same side of the machine after said sheets have been arrested by the assembling-gage $i$. For this purpose I prefer to employ paper-shifting grippers constructed and operating similar to that shown in my application for Letters Patent, Serial No. 596,503, filed June 22, 1896. Each of said grippers consists of a shoe $p$, which is open at both ends and at the side facing toward the longitudinal passage of the paper and is provided on its under side with a flanged saddle $p'$, by which it slides lengthwise on one of the three parallel horizontal guide-bars $q$, which are fastened to the side of the main frame D and extend part way across the machine, as shown in Fig. 15 of the drawings. Said shoe receives reciprocating motion, as hereinafter described. The top of the shoe is provided with posts $p^2$, in which is journaled a short shaft $p^3$, as shown in Figs. 24, 25, and 26 of the drawings. To this shaft is rigidly secured the gripper-finger $p^4$, which plays through an aperture in the top of the shoe to grip the paper upon the interior bottom of the shoe. Said gripper-finger is actuated by means of a rock-shaft $q'$, which is parallel with the guide-bar $q$ and journaled in the side of the main frame, through which it protrudes, as shown in Fig. 15 of the drawings. Said rock-shaft has secured to it a plate $q^2$, which is parallel with the shaft and plays between two lugs $q^3$, projecting from the gripper-shaft $p^3$. To impart a snap-spring action to the gripper-finger, the gripper-shaft has affixed to it a lug $p^5$, having on its outer face two depressed faces $p^6$ $p^6$ with an intervening ridge $p^7$, and to the top of the shoe is fastened a spring-finger $p^8$, having pivoted to its free end a roller $p^9$, by which it bears on the aforesaid outer face of the lug $p^5$, as illustrated in Figs. 24, 25, and 26 of the drawings. In the rocking motion of the gripper-shaft the aforesaid spring-finger slips back and forth over the ridge $p^7$, and thereby imparts to the gripper-finger the aforesaid spring action.

In order to impart synchronous action to the three rock-shafts $q'$, I attach to the outer ends of said shafts levers $r$ $r'$ $r^2$, which are coupled together by rods $s$ and $s'$. Another lever $r^3$ is attached to one of said rock-shafts and connected by a pitman $s^2$ to the end of an arm $s^3$, which is pivoted at its opposite end to the main frame D and receives oscillatory motion from a rotary cam S, against which it is made to bear by means of a spiral spring S', surrounding the pitman $s^2$ and bearing with one end on a lug $s^4$, projecting from the main frame. The opposite end of said spring presses against a collar $s^5$, attached to the pitman between the lug $s^4$ and arm $s^3$, as illustrated in Fig. 14 of the drawings. The three grippers are also caused to reciprocate in unison lengthwise of the guide-bars $q$ by connections of said grippers to a head T, which is attached to the end of a reciprocating bar T', by which it is moved toward and from the side of the machine or laterally toward and from the planes of the tributary tapes $b$ $b'$ $b^2$. To allow these grippers to be adjusted for operating on sheets of different width, I connect said grippers to the head T by means of screws $t$ $t$ $t$, working in screw-threaded eyes in said head and pivotally connected to the gripper-shoes. The outer ends of said screws are provided with hand-wheels $t'$ $t'$ $t'$, by which to turn the screws in adjusting the grippers as aforesaid.

The reciprocating bar T' receives its motion in one direction by means of a spiral spring $t^2$, surrounding a rod $t^3$, which is fastened to the frame D and disposed parallel with the bar T'. The outer end of said spring bears against a collar $t^4$, attached to the rod, and the opposite or inner end presses against a lug $t^5$ on the bar T', as clearly shown in Fig. 15 of the drawings. Said bar T' is forced in the opposite direction by means of a lever U, pivoted at one end to the frame D and connected at the opposite end to the bar T by a rod U'. To the lever U, intermediate the length thereof, is pivoted a roller $U^3$, which bears against a rotary cam $U^2$ on the shaft P.

In order to guard against stitching the sheets in case they are misfed or one or more of them fail to be delivered to the main tapes $a$, which carry the paper to the stitching-machines, I place in a suitable position in the path of the paper to said machines a suitable switch for diverting the paper from its passage to the stitching-machine. I preferably place said switch between the drop-rollers $m$ and assembling-gage $i$, especially in proximity to said drop-rollers, which aid in the switching of the paper out of the path to the stitching-machine, as hereinafter described. Said switch is illustrated in Figs. 21 and 22 of the drawings, and is formed of a rock-shaft $u$, extending across the machine at the receiving ends of the main tapes $a$ $a$ or in proximity to the tape-roller $a'$ and mounted in suitable bearings on the sides of the frame D. From said shaft project fingers $u$, which in their normal position span the space between the delivery ends of the tributary tapes and receiving ends of the main tapes $a$, as represented by dotted lines in Fig. 21 of the drawings, in which position said fingers serve to support the portion of the paper passing over it when all the sheets are properly fed to the main tapes $a$. The rock-shaft $u$ when turned to switch the paper from the path to the main tapes $a$ causes the free ends of the switch-fingers $u'$ to rise from their aforesaid normal position, as shown by full lines in Fig. 21 of the drawings, which position causes the paper in transit to pass under said switch-fingers and also to be cast underneath the machine or into a suitable receptacle. (Not shown.) The drop-rollers $m$ bear in the meantime on the paper and thereby cause said paper to be propelled to the diverting-switch, as indicated by arrows in Figs. 21 and 22 of the drawings. To deflect the switched paper more positively downward from the switch, I attach to the rock-shaft $u$ downwardly-projecting fingers $u^2$.

In case the action of the drop-rollers is timed to release the paper before it is completely switched out of the path, as aforesaid, I employ suitable gripping devices for drawing the paper down from the switch with sufficient rapidity to prevent said paper from interfering with the travel of the next succeeding complete set of sheets over the top of the switch-fingers $u'$.

For gripping and moving the paper as aforesaid I prefer to employ two horizontal rollers $v$ $v$, disposed parallel side by side and in sufficient proximity to each other to grip the paper between them, the downwardly-projecting fingers $u^2$ serving to guide the paper into the bite of said rollers. To corresponding ends of these rollers are fastened intermeshing gears $v'$ $v'$, which cause the rollers to rotate with their top portions toward each other, and thus draw the paper down between the rollers. Said gears receive motion from a gear $v^2$ on the end of the tape-roller $f'$, an intermediate pinion $v^3$ transmitting motion from the gear $v^2$ to one of the gears $v'$, as illustrated in Fig. 22 of the drawings.

W and W' denote, respectively, the main driving-pulley and loose pulley. $W^2$ is the driving-belt, and $W^3$ the belt-shifting lever, as more clearly shown in Fig. 13 of the drawings.

The more important feature of my invention, however, resides in the devices for automatically controlling the operation of all the mechanisms hereinbefore described by the paper in transit in said machine. This I accomplish primarily by means of mechanical feelers disposed in the paths of the sheets to detect failures in the supply of the sheet or sheets and means arresting the operation of the machine influenced by the aforesaid feeler failing to detect passage of paper to the machine. In connection with said feelers I employ electromagnetically-operated devices in an electric circuit controlled by said feelers, as hereinafter described. For this purpose I form each of said feelers of two flexible metallic fingers 20 and 21, secured to bars 22, which extend across the machine over the planes of the respective sets of tributary tapes $b$ $b'$ $b^2$ and are attached to the sides of the main frame D. The free ends of each pair of said feelers or fingers are normally in the plane of the tapes and in contact with each other and are sufficiently flexible to allow them to be separated by the paper passing between them.

The three pairs of feelers or fingers in the respective planes of the three tributary tapes constitute three circuit makers and breakers, which operate independently of each other and normally close the circuit. The breaking of the circuit is effected by the paper carried on the tapes and passing between the free ends of the feelers 20 and 21. The electric circuit is illustrated diagrammatically in Fig. 23 of the drawings, in which H' represents the battery or source of electric energy. In order to permit one or more of the aforesaid circuit makers and breakers to be cut out of the circuit when desired, I provide a suitable separate switch 23 for each pair of feelers 20 and 21 and connect one of the feelers, as 21, of each pair to one of the poles of its respective switch, as shown at 25. The other poles of the three switches are suitably connected to one branch, 90, of the main line of the circuit, and the feelers 20 are connected, respectively, by wires 24 to the other branch, 91, of said main line. Each of said switches is equipped with a manipulating-lever or other suitable device 16 to allow the switches to be controlled independently of each other. Said Fig. 23 shows one pair of feelers 20 and 21 cut out of the circuit at X. This is done in case no sheet is intended to be fed between said feelers. It will be observed that all of said feelers are normally in circuit-closing position, and the circuit cannot be opened or broken except sheets of paper pass through all of said sets of feelers simultaneously. Hence the electromagnetically-controlled safety mechanisms hereinafter described are maintained in action as long as one or more sheets fail to pass at the proper time into the machine.

One of the chief objects of the invention is to automatically prevent the stitching or stapling of a misfed or incomplete set of sheets. To accomplish this, I employ an electromagnetically-controlled mechanism transmitting motion to the stitching or stapling machines J J. This mechanism I preferably construct as follows: Across the machine is extended a counter-shaft 17, which is parallel with the shafts 18 of the stitching or stapling machines and is journaled in suitable bearings in the sides of the main frame D. On said countershaft is loosely mounted a gear-wheel 19, which by means of a train of gears 26, 27, 7, 9, and 10 receives positive rotary motion from the shaft 11, hereinbefore referred to. To the shaft 17 are fastened two gear-wheels 28, which transmit motion to the two gear-wheels 29 on the shafts 18 of the two stitching-machines J J, as shown in Figs. 16 and 18 of the drawings. The loosely-mounted gear 19 has affixed to it a clutch-collar 30, which is provided with a notch in its periphery. Adjacent to this collar is a similar clutch-collar 32, provided with a corresponding notch 31. A dog 33 is pivoted to the fixed collar 32 and provided with a tooth 34, which is adapted to engage simultaneously the two aforesaid notches in the clutch-collars and thereby tie the loosely-mounted gear to the shaft 17 and cause it to rotate therewith. The dog is formed with a heel 35, which projects beyond the pivot of the dog and has connected to it a rod 36, which slides in an eye 37 on the clutch-collar 32 and has affixed to it a collar 38, which is between the said eye and heel 35. A spiral spring 39, surrounding the rod 36 between the eye 37 and collar 38 and pressing against said parts, serves to force the dog 33 into engagement with the notches in the clutch-collars. The release of the clutch-collars from said dog is effected by electromagnetically-controlled mechanism in circuit with the hereinbefore-described circuit makers and breakers 20 and 21, which are actuated by the paper in transit to the stitching-machines. On one end of the shaft 17 is loosely mounted a pinion 40, to which is fastened a cam 41. Across the entire machine extends a rock-shaft 42, which is mounted in suitable bearings on the frame D and has attached to one of its ends an arm 43, which has pivoted to its free end a roller 44, by which said arm rides on the cam 41. Another arm 45 is attached to the opposite end of said rock-shaft and has connected to it a weight 46, which serves to turn the shaft, so as to maintain the roller 44 in contact with the cam 41. The free end of the arm 45 has also pivoted to it a roller 47, which is traversed by the dog 33 during the rotation of the clutch-collar 32, and in said movement the roller is caused to press on the heel 35 of said dog and thereby throw the same out of engagement with the two clutch-collars. This latter effect of the arm 45, however, is only produced when the cam 41 is actuated, as hereinafter described. The pinion 40 is engaged by a vertical rack 48, which is connected parallel to a reciprocating pitman 49 and to some extent movable longitudinally thereon, which latter movement is limited by two stops 53, secured to the pitman near the ends of the rack-bar. The pitman receives its upward movement by a roller 50, pivoted to the pitman and riding on top of a rotary cam 51, attached to the shaft P. A weight 52, attached to the pitman, serves to draw it down. To the pitman is firmly secured an electromagnet 54, which is in circuit with the circuit makers and breakers 20 and 21. The armature 55 of said magnet is pivoted to the pitman and formed with a dog 56, which is caused to engage a notch or shoulder on the rack-bar 48 when the armature is attracted by the magnet. Otherwise said dog is caused to release said rack-bar by the usual spring drawing the armature from the magnet deprived of energy. The dog 56 and shoulder on the rack-bar are so arranged as to cause said rack-bar to be pushed up by the upwardly-moving pitman when the magnet is energized. This movement turns the pinion 40. The cam 41, which is attached to said pinion, being turned correspondingly causes said cam to lift the end of the arm 43, riding on said cam. This action of said arm turns the rock-shaft 17 sufficiently to cause the other arm 45 to press on the heel 35 of the dog 33 during the rotation of the clutch-collar 32, and by said pressure the said dog is forced out of engagement with the notches 31 in the two clutch-collars 32 and 30, and thus the rock-shaft 17 is deprived of motion and rendered incapable of transmitting motion to the stitching-machines J J. This takes effect when either of the tributary tapes $b\ b'\ b^2$ fails to deliver paper to the machine and thereby allows the circuit to be closed by the feelers 20 and 21 in the plane of said tapes coming in contact with each other. Hence the operation of the stitching-machines is arrested whenever either the main sheet or the insert-sheet or the cover-sheet fails to pass into the machine.

It is, however, important to arrest the motion of the stitching or stapling machines at times when the mechanisms thereof are out of stitching or stapling positions in order to prevent entanglement of the wires or staples. To guard against this, it is necessary to properly time the closing of the circuit, and for this purpose I employ a secondary or intermediate circuit maker and breaker actuated by mechanism of the machine and controlling the energy of the magnet 54 on the pitman 49. This mechanically-operated intermediate circuit maker and breaker consists of an electric terminal 57, attached to the frame D, and a reciprocating pitman 58, rocking a terminal 59, which is brought into contact with the terminal 57 at the end of each stroke of the pitman in one direction. Said pitman is actuated by means of a cam 60, attached to the shaft P. The aforesaid terminals are in circuit with the circuit makers and breakers 20 and 21, as illustrated in Fig. 23 of the drawings. The movement of the pitman 58 is so timed as to carry the terminal 59 into contact with the terminal 57 at the time when the mechanisms of the stitching-machines are out of stitching positions.

Inasmuch as the hereinbefore-described switch $u'$ is to be operated to divert the incomplete set of sheets from the path of the stitching-machines at the same time when the operation of said stitching-machines is arrested, I provide suitable means for transmitting motion from the rack-bar 48 to the said switch. Said means are more fully illustrated in Fig. 21 of the drawings, and consist of an arm 61, fastened to the end of the switch-shaft $u$ and connected at its free end by a link 62 to one end of a lever 63, pivoted intermediate its length to the frame D, and connected at the opposite end to the rack-bar 48.

To allow the entire machine to be stopped without requiring the person in charge to manipulate the belt-shifting lever $W^3$ or even approach the side of the machine at which said lever is located, I employ electromagnetically-controlled mechanism for shifting the belt, and in connection with said mechanism I employ a plurality of switches or circuit makers and breakers 64 and 65, located on different parts of the machine, as represented in Fig. 13 of the drawings. Said mechanisms consist of a longitudinally-movable bar 66, extending across the entire machine and supported in suitable guides 67 on the frame D and connected to the belt-shifting lever $W^3$. Parallel upon this bar is mounted a pitman 68, which slides thereon longitudinally. Said pitman receives reciprocating motion from a rotary cam 69 by means of a bell-crank 70, pivoted to the frame D and having pivoted to one of its arms a roller 71, which is held in contact with the cam 69 by means of a spring-actuated rod 72. The other arm of said bell-crank is connected to the aforesaid pitman by a bar 73. To this pitman is attached an electromagnet 74, which may be either in circuit with the circuit makers and breakers 20 and 21, as illustrated more particularly in Fig. 23 of the drawings, or in a separate circuit, as represented in Fig. 13 of the drawings. To the pitman 68 is pivoted the armature 75, which is formed with a dog 76, adapted to engage and release a shoulder 77 on the belt-shifting bar 66. By turning the switches 64 or 65, so as to close the circuit, the attraction of the armature 75 by the magnet 74 throws the dog 76 into a position to engage the shoulder 77 on the belt-shipping bar during the movement of the pitman in one direction, whereby the lever $W^3$ is caused to shift the belt $W^2$ from the tight pulley W to the loose pulley W'. In case it is desired to effect said shifting of the driving-belt automatically when either of the required sheets fails to pass into the machine, I omit the extra circuit and the switch 65, (shown in Fig. 13,) and instead of such arrangement I connect the magnet 74 and switch 64 with the same circuit, which includes the circuit makers and breakers 20 and 21, as shown in Fig. 23. The said switch in this instance is to be maintained in circuit-closing condition and the driving-belt remains on the loose pulley until the circuit is broken by all of the required sheets passing simultaneously between the entire set of fingers 20 and 21. Hence the operation of the entire machine is stopped in case either the main sheet or insert-sheet or cover-sheet fails to be fed to the machine.

I also prefer to employ with the described automatic stopping devices an automatic alarm, which is represented of the form of a suitable electric bell 78, which is in circuit with the circuit makers and breakers 20 and 21, as illustrated in Fig. 23 of the drawings. This alarm serves to apprise the person in charge of the machine or other person interested in the operation of the machine of any of the aforesaid accidental defects in the feeding of the several component sheets to the machine.

The various shafts and gears required for operating the machine may be arranged in different ways, according to the judgment of the builder of the machine, or as may be found necessary to conform to modifications of the detail construction and arrangement of the mechanisms herein described, and in regard to which I do not wish to be limited.

The main gears 80, 81, 82, 83, 84, 85, and 86 in Fig. 3 of the drawings are indicated by dotted lines to obviate obstructions to views of other more important parts of the machine.

What I claim as my invention is—

1. The combination with a wire-stitching machine and a plurality of sets of traveling tapes conveying a plurality of sheets of paper simultaneously to said machine, of mechanism transmitting motion to the stitching-machine and controlled in its action automatically by the sheet in transit in either plane independently of the sheet or sheets carried in the other plane or planes.

2. The combination with a wire-stitching machine, conveyers carrying the paper to said machine and mechanisms actuating the stitching-machine, stop mechanism controlling said actuating mechanism, means for controlling the stop mechanism by the paper in transit through the stitching-machine, and means for timing the action of the stop mechanism, as set forth.

3. The combination with a wire-stitching machine and a plurality of sets of traveling tapes conveying to said machine the component sheets of a pamphlet or book to be stitched, of an electric circuit, electromagnetically-controlled mechanism transmitting motion to said stitching-machine and in electric connection with said circuit, and a plurality of circuit makers and breakers actuated respectively by the sheets in transit on the aforesaid different sets of tapes as set forth.

4. The combination with a wire-stitching machine and a plurality of sets of paper-conveying tapes leading to said machine to supply thereto a plurality of sheets simultaneously, bars disposed above and beneath each of said sets of tapes, an electric circuit, circuit making and breaking fingers supported on said bars and arranged in sets, each of which is normally in circuit-closing position and has the plane of one of the sets of tapes passing between the terminals to cause the passing paper to break the circuit, and an electromagnetically-controlled mechanism transmitting motion to the stitching-machine in electric connection with the aforesaid circuit as set forth.

5. The combination with the wire-stitching machine and a plurality of sets of paper-conveying tapes leading to said machine to supply thereto a plurality of sheets simultaneously, of an electric circuit, an electromagnetically-controlled mechanism transmitting motion to said stitching-machine, an automatically-operated circuit-closer timed to cause the motion of the stitching-machine to be arrested during the period in which said machine is out of stitching position as set forth.

6. In combination with the wire-stitching machine and a plurality of sets of paper-conveying tapes leading to said machine, an electric circuit, an electromagnetically-controlled mechanism transmitting motion to said stitching-machine, circuit makers and breakers actuated by the sheets in transit on the aforesaid tapes, a rotary cam, a pitman actuated by said cam, and a circuit maker and breaker actuated by said pitman, said cam timing the motion of the pitman to close the circuit during the period in which the stitching-machine is out of contact with the paper as set forth.

7. The combination with a wire-stitching machine and a plurality of sets of traveling tapes conveying a corresponding plurality of sheets simultaneously to said machine, of an electric circuit, electromagnetically-controlled mechanism transmitting motion to said stitching-machine and in electric connection with said circuit, and circuit makers and breakers actuated by the sheets in transit on the aforesaid conveyers.

8. In combination with a wire-stitching machine, a plurality of automatic paper-feeding machines, separate sets of conveyers carrying the sheets of paper from the respective feeding-machines to the stitching-machine, an intermittently-operating gage assembling the sheets in front of the stitching-machine, gages intermittently arresting the movement of the assembled sheets through the stitching-machine to receive the staples or stitches therefrom, an electric circuit, an electromagnetically-controlled mechanism transmitting motion to the stitching-machine, and a plurality of sets of circuit makers and breakers in the respective paths of the sheets to the assembling-gage as and for the purpose set forth.

9. In combination with a wire-stitching machine and a plurality of sets of sheet-conveyers carrying a plurality of sheets simultaneously to said machine, an electric circuit, electromagnetically-controlled mechanism transmitting motion to the stitching-machine, a plurality of sets of circuit makers and breakers actuated respectively by the sheets in transit to the stitching-machine, and switches connected respectively with the sets of circuit makers and breakers to cut one or more of said sets out of the circuit as set forth.

10. In combination with a wire-stitching machine, a set of main-sheet conveyers, a set of insert-sheet conveyers and a set of cover-conveyers, all leading toward the stitching-machine, a gage assembling said sheets and cover in front of said machine, and automatic paper-folders folding respectively the main sheet and the insert sheet in their passage to the assembling-gage as set forth.

11. The combination with a wire-stitching machine and tapes conveying the paper to said machine, of a gage temporarily arresting said movement of the paper, a paper-registering device shifting the arrested paper into alinement with the stitching-machine, and intermittently-operating drop-rollers imparting intermittent impulses to the travel of the registered paper to the stitching-machine as set forth.

12. The combination with a plurality of sets of sheet-conveyers disposed one over the other and leading in the same direction, a gage assembling the sheets delivered by said conveyers, and paper-registering devices over the respective sets of conveyers to aline the sheets on said conveyers as set forth.

13. In combination with a wire-stitching machine, a plurality of automatic paper-feeding machines, tapes conveying the sheets from said feeding-machines toward the stitching-machine, a gage assembling the sheets in front of the stitching-machine, and a plurality of paper-registering devices alining the assembled sheets in relation to each other.

14. In combination with a wire-stitching machine, a plurality of automatic paper-feeding machines, a corresponding plurality of sets of tapes conveying the sheets toward the stitching-machine, a gage assembling said sheets in front of the stitching-machine, paper-registering devices alining the assembled sheets in relation to each other, an electric circuit, electromagnetically-controlled mechanism transmitting motion to the stitching-machine, and circuit makers and breakers in the path of the sheets to the assembling-gage and actuated by the sheets in transit.

15. In a paper assembling and binding machine the combination with the stitching or stapling machine and a plurality of sets of tapes conveying sheets of paper simultaneously to said stitching or stapling machine, of a head at the side of the main frame and moving laterally to and from the same, and paper-registering devices over the respective sets of tapes and connected to the aforesaid head to partake motion therefrom as set forth.

16. In a paper assembling and binding machine the combination with the stitching or stapling machine and a plurality of sets of tapes conveying sheets of paper simultaneously to said stitching or stapling machine, of a head sustained at the side of the main frame and movable laterally to and from the same, mechanism imparting said motion to the head, bars mounted on the main frame and extending transversely over the respective sets of tapes and paper-registering devices carried on said bars and connected to the aforesaid head to partake motion therefrom as set forth.

17. In a paper assembling and binding machine the combination with the stitching or stapling machine and a plurality of sets of tapes conveying sheets of paper simultaneously to said stitching or stapling machine, of a reciprocating bar disposed at right angles to the line of travel of the paper, a head fastened to the end of said bar, bars mounted on the main frame and extending transversely over the respective sets of tapes and paper-shifting grippers sliding on said bars lengthwise thereof and connected to the aforesaid head to partake motion therefrom as set forth.

18. In a paper assembling and binding machine the combination with the stitching or stapling machine, a plurality of sets of tapes conveying sheets simultaneously to said stitching or stapling machine and a gage assembling the sheets preparatory to being stitched or stapled, guides mounted on the sides of the main frame, a bar extending across the main frame and sliding in the aforesaid guides, mechanism imparting intermittent reciprocating motion to said bar, a head attached to the end of said bar, guide-bars fixed to the main frame and extending transversely over the respective sets of tapes, paper-shifting grippers sliding on the latter bars, and rods connected to said head longitudinally adjustable and coupled to the grippers to transmit motion from the head to the grippers as set forth.

19. In combination with a plurality of sets of paper-conveying tapes disposed in planes successively one over the other, and a gage assembling the sheets of paper, a head movable laterally toward and from said sets of tapes, mechanism imparting said motion to the head, stationary bars disposed transversely over the respective sets of tapes, paper-shifting grippers sliding longitudinally on said bars and connected to the aforesaid head to partake motion therefrom, rock-shafts opening and closing the respective grippers, levers attached to said rock-shafts, rods coupling said levers together to impart synchronous motion to the rock-shafts, and mechanism imparting motion to said levers as set forth.

20. In combination with the stitching-machine, a plurality of paper-feeding machines, a corresponding number of sets of tapes conveying the sheets of paper from the respective feeding-machines toward the stitching-machine, automatic paper-folders folding the main sheet and insert sheet in their aforesaid travel, a gage assembling the sheets in front of the stitching-machine, paper-registering devices in the paths of the respective sheets to the assembling-gage, and tapes conveying the assembled sheets to the stitching-machine as set forth.

21. In combination with the stitching-machine, a plurality of paper-feeding machines, a corresponding number of sets of tapes conveying the sheets from the respective feeding-machines toward the stitching-machine, automatic paper-folders folding the main sheet and insert sheet in their said travel, a gage assembling the sheets delivered thereto by the aforesaid tapes, paper-conveying tapes leading from the assembling-gage to the stitching-machine and intermittently-operating drop-rollers imparting impulses to the travel of the assembled sheets to the stitching-machine as set forth.

22. The combination with the wire-stitching machine, a plurality of paper-feeding machines, a corresponding number of sets of tapes conveying the paper toward said stitching-machine and a gage assembling the sheets in their said travel, of paper-registering devices each alining one of the assembled sheets, tapes conveying said sheets from the assembling-gage to the stitching-machine, and intermittently-operating drop-rollers imparting impulses to the sheets during the latter travel as set forth.

23. The combination with the wire-stitching machine, a plurality of paper-feeding machines, a corresponding number of sets of tapes conveying the paper toward the stitching-machine and a gage assembling the sheets in said travel, of paper-registering devices alining the assembled sheets, tapes conveying the alined sheets to the stitching-machine, intermittently-operating gages temporarily arresting said movement of the sheets to allow said sheets to be stitched or stapled, and drop-rollers imparting impulses to the sheets between their stoppages by the gages as set forth.

24. The combination with a wire-stitching machine, a plurality of paper-feeding machines, a corresponding number of sets of tapes conveying the paper toward the stitching-machine and a gage assembling the sheets in said travel, an electric circuit, electromagnetically-controlled mechanisms imparting motion to the stitching-machine, circuit makers and breakers in the respective lines of travel of the sheets to the assembling-gage and actuated by the sheets in transit, tapes conveying the assembled sheets to the stitching-machine, gages intermittently arresting said travel of the sheets, and drop-rollers imparting impulses to the sheets between their stoppages by the gages as set forth.

25. The combination with the stitching-machine, of three paper-feeding machines respectively for the main sheet, insert sheet and cover, separate sets of tapes conveying said sheets and cover toward the stitching-machine, the insert-sheet-conveying tapes being in a plane between those of the others of said conveying-tapes, a downward paper-folder over the path of the main-sheet-conveying tapes, an upward paper-folder under the path of the insert-sheet-conveying tapes, a gage assembling all of said sheets in front of the stitching-machine, tapes conveying the assembled sheets to the stitching-machine, gages intermittently arresting this latter movement of the sheets, and drop-rollers imparting impulses to the sheets between the stoppages by the gages as set forth.

26. In combination with the stitching-machine and tapes conveying the paper to said machine, a shaft actuating the stitching or stapling mechanism, a gear-wheel attached to said shaft, a counter-shaft, a positively-driven gear mounted loosely on said counter-shaft, a gear fixed to said shaft and transmitting motion to the gear of the stitching-machine shaft, a clutch for intermittently fastening the loosely-mounted gear to the counter-shaft, an electric circuit, electromagnetically-controlled mechanisms operating said clutch, and circuit makers and breakers actuated by the paper in transit to the stitching-machine and thereby controlling the action of the aforesaid clutch.

27. In combination with the stitching-machine and tapes conveying the paper to said machine, a shaft actuating the stitching or stapling mechanism, a gear-wheel attached to said shaft, a counter-shaft, a positively-driven gear mounted loosely on said counter-shaft, a gear fixed to the counter-shaft and transmitting motion to the stitching-machine shaft, a clutch for intermittently fastening the loosely-mounted gear to the counter-shaft, mechanism actuating said clutch, an electric circuit, a constantly-moving pitman, an electromagnet attached to said pitman, a catch connected to the pitman movably to engage and release the clutch-actuating mechanism and actuated by the armature of the aforesaid magnet, and circuit makers and breakers actuated by the paper in transit to the stitching-machine as set forth.

28. In combination with the stitching-machine, a plurality of paper-feeding machines, a corresponding plurality of sets of tapes conveying the sheets from said feeding-machines toward the stitching-machine, a gage assembling said sheets in front of the stitching-machine, tapes carrying the sheets from the assembling-gage to the stitching-machine, gages intermittently arresting the sheets in said latter movement, a gear-wheel attached to the stitching-machine shaft, a counter-shaft, a positively-driven gear mounted loosely on said counter-shaft, a gear fixed to said shaft and transmitting motion to the gear of the stitching-machine shaft, a clutch for intermittently fastening the loosely-mounted gear to the counter-shaft, an electric circuit, electromagnetically-controlled mechanisms operating said clutch, and circuit makers and breakers actuated by the sheets in transit to the stitching-machine and thereby controlling the action of the clutch as set forth.

29. In combination with the stitching-machine, a plurality of paper-feeding machines, a corresponding plurality of sets of tapes conveying the sheets toward the stitching-machine, automatic paper-folders folding the main sheet and inserting sheets in said transit, a gage assembling the sheets in front of the stitching-machine, tapes conveying the assembled sheets to the stitching-machine, gages intermittently arresting the sheets in said latter movement, drop-rollers impelling the sheets during their releases from the aforesaid gages, a gear-wheel on the stitching-machine shaft, a counter-shaft, a positively-driven gear mounted loosely on said counter-shaft, a gear fixed to said shaft transmitting motion to the gear of the stitching-machine shaft, a clutch for intermittently fastening the loosely-mounted gear to the counter-shaft, an electric circuit, electromagnetically-controlled mechanisms operating said clutch, and circuit makers and breakers actuated by the sheets in transit to the stitching-machine.

30. In combination with the stitching-machine provided with a driving-gear on its shaft and tapes conveying to said machine the paper to be stitched or stapled, a counter-shaft having affixed to it a gear for transmitting motion to the gear of the stitching-machine shaft, a positively-driven gear mounted loosely on said counter-shaft and having affixed to it a collar provided with a notch in its periphery, a collar fastened to the counter-shaft and provided with a corresponding notch, a dog pivoted to said fixed collar and provided at one end with a tooth for engaging both of said notches simultaneously, and formed with a heel extending beyond the pivot of the dog, a spring forcing said dog toward its engagement with the aforesaid notches, a rock-shaft, an arm on said shaft traversed by the dog during the rotation of the notched collars, an arm fixed to said shaft for actuating the same, a pivoted cam actuating the latter arm, an electric circuit, electromagnetically-controlled mechanism actuating said cam, and circuit makers and breakers actuated by the sheets in transit to the stitching-machine.

31. The combination with a machine provided with an actuating-gear, and conveyers supplying to said machine the material to be operated on, of a clutch for throwing said machine in and out of gear, a rock-arm actuating the clutch in one direction, a second rock-arm actuating the first rock-arm, a pivoted cam actuating the second rock-arm, a pinion attached to said cam, a reciprocating pitman, a rack carried on said pitman and movable longitudinally thereon and meshing with the aforesaid pinion, an electric circuit, an electromagnet carried on the pitman, the armature pivoted to the pitman and provided with a dog for engaging and releasing the rack, and circuit makers and breakers actuated by the material in transit to the aforesaid machine as set forth.

32. In combination with the stitching-machine provided with an actuating-gear on its shaft, a plurality of paper-feeding machines and a corresponding plurality of sets of tapes conveying the paper to said machine, gages intermittently arresting the movement of the paper to permit the stitching of the same, a counter-shaft having affixed to it a gear for transmitting motion to the gear of the stitching-machine, a positively-driven gear mounted loosely on said counter-shaft and having affixed to it a collar provided with a notch in its periphery, a collar fastened to the counter-shaft and provided with a corresponding notch, a dog pivoted to said fixed collar and provided at one end with a tooth for engaging both of said notches simultaneously and formed at the opposite end with a heel extending beyond the pivot of the dog, a spring forcing said dog toward engagement with the notches, a rock-shaft, an arm on said shaft traversed by the said dog, to actuate the same in opposition to its spring, an arm fixed to said shaft for actuating the same, a pivoted cam actuating the latter arm, a pinion attached to said cam, a reciprocating pitman, a rack carried on said pitman movable longitudinally thereon and meshing with said pinion, an electric circuit, an electromagnet attached to the pitman, the armature pivoted to the pitman and provided with a dog for engaging and releasing the rack-bar, and circuit makers and breakers in the paths of the sheets to the stitching-machine and actuated by the sheets in transit as set forth.

33. In combination with the stitching-machine, paper-feeding machines and tapes conveying the paper to said stitching-machine, gages intermittently arresting the movement of the paper to prevent the stitching of the same, a clutch for throwing the said stitching-machine in and out of gear, a spring forcing the clutch into gear, a rock-shaft having affixed to it an arm for forcing the clutch out of gear, an arm on said rock-shaft for operating it, a pivoted cam actuating said arm, a pinion attached to said cam, a positively-actuated pitman, a rack carried on said pitman and movable longitudinally thereon and engaging the aforesaid pinion, an electric circuit, an electromagnet attached to the pitman, the armature pivoted to the pitman and formed with a dog engaging and releasing the rack-bar, circuit makers and breakers actuated by the paper in transit to the stitching-machine, and an automatically-operated circuit-closer timed to close the circuit during the period in which the stitching-machine is out of stitching position as set forth.

34. In combination with two stitching-machines disposed at opposite sides of and on a line at right angles to the central line of the travel of the paper-conveying tapes, a plurality of paper-feeding machines, tapes conveying the paper toward the stitching-machines and gages intermittently arresting the movement of the paper to permit the stitching thereof, gears on the shafts of the stitching-machines, a counter-shaft extending across the entire machine, gears fastened to the two end portions of the counter-shaft and transmitting motion to the gears of the stitching-machine shafts, a positively-driven gear mounted loosely on said counter-shaft and having affixed to it a clutch-collar, a corresponding clutch-collar fastened to the counter-shaft, a dog normally locking the clutch-collars to each other, an electric circuit, electromagnetically-controlled mechanism throwing the dog out of engagement, circuit makers and breakers actuated by the sheets in transit to the stitching-machines, and an intermediate circuit maker and breaker actuated by mechanism timed to close the circuit when the stitching-machines are out of stitching positions as set forth.

35. The combination with a stitching or stapling machine and conveyers carrying the paper to said machine, of a switch disposed to throw misfed sheets from said conveyers and prevent their passage through said machine, and means actuated by the paper in transit on said conveyers and controlling the action of the switch, as set forth.

36. In combination with the set of main tapes, a paper-cutter in the central line of travel of said tapes and two sets of paper-folders disposed to receive the severed sheets, a plurality of paper-feeding machines, a corresponding plurality of sets of tapes leading from said feeding-machines to the main tapes, a gage assembling the sheets at their delivery to the main tapes, and two stitching-machines between the assembling-gage and paper-cutter and adjustable laterally at opposite sides of the central line of travel of the main tapes as set forth.

37. The combination with a stitching or stapling machine, conveyers carrying the paper to said machine and a packing-box receiving the stitched or stapled papers, of a switch disposed to throw misfed sheets from said conveyers and exclude them from the said machine and from the packing-box, an electric circuit, electromagnetically-controlled mechanism actuating said switch, and circuit makers and breakers actuated by the paper in transit to the stitching or stapling machine.

38. The combination with the stitching or stapling machine a packing-box receiving the stitched or stapled papers and a set of main tapes conveying the sheets to said machine, tributary tapes delivering the sheets to said main tapes, a switch located between the main tapes and tributary tapes to divert misfed sheets from the stitching or stapling machine and from the packing-box, and drop-rollers over the delivery of the tributary tapes to facilitate the diversion of the misfed sheets from the main tapes.

39. The combination with the stitching-machine a packing-box receiving the stitched paper and a set of main tapes conveying the paper to said machine, tributary tapes carrying the paper toward the main tapes, a rock-shaft extending across the receiving ends of the main tapes and paper-guides on said rock-shaft to divert misfed sheets from the stitching-machine and exclude said sheets from the packing-box.

40. The combination with the stitching-machine and a set of main tapes conveying the paper to said machine, tributary tapes carrying the paper toward said main tapes, a rock-shaft extending across the receiving ends of the main tapes, paper-guides attached to said rock-shaft, an electric circuit, electromagnetically-controlled mechanism actuating said rock-shaft, and circuit makers and breakers in the planes of the tributary tapes to be actuated by the paper in transit.

41. The combination with the stitching-machine and a set of main tapes conveying the paper to said machine, tributary tapes carrying the paper toward the main tapes, drop-rollers over the delivery ends of said tributary tapes, a rock-shaft extending across the receiving ends of the main tapes, paper-guides attached to said rock-shaft, an electric circuit, electromagnetically-controlled mechanism operating the rock-shaft, and circuit makers and breakers actuated by the paper in transit to the main tapes as set forth.

42. The combination with a machine designed to stitch or otherwise operate on paper a packing-box disposed to receive the paper from said machine and conveyers carrying the paper to said machine, of a switch in the path of the paper to said machine to divert misfed sheets from the same, and gripping devices drawing the switched paper from the aforesaid path and excluding said paper from the packing-box.

43. The combination with the stitching-machine, a packing-box disposed to receive the stitched paper and conveyers carrying the paper to said machine, of a switch in the path of the paper to divert misfed sheets from the stitching-machine, contiguously-disposed parallel rollers receiving the switched paper between them and geared to rotate and draw said paper from the aforesaid path and exclude it from the packing-box.

44. The combination with the stitching-machine and conveyers carrying the paper to said machine, of a rock-shaft extending across the receiving end of said conveyers, paper-guides attached to said rock-shaft and moved thereby to and upwardly from the path of the paper and guides extending downward from said rock-shaft, and gripping devices receiving the downwardly-deflected paper and drawing the same from the aforesaid path.

45. The combination with the stitching-machine, main tapes carrying the paper to said machine, and tributary tapes delivering the paper to said main tapes, of drop-rollers over the delivery ends of the tributary tapes, a switch interposed between the tributary tapes and main tapes to divert misfed sheets from the stitching-machine, and gripping devices drawing the switched paper from the tributary tapes as set forth.

46. The combination with the stitching-machine, main tapes carrying the paper to said machine and tributary tapes delivering the paper to the main tapes, of a switch interposed between the tributary tapes and main tapes to divert misfed sheets from the stitching-machine and controlled by the paper in transit on the tributary tapes, and gripping devices withdrawing the switched paper from the tributary tapes.

47. The combination with the stitching-machine and main tapes carrying the paper to said machines, a plurality of paper-feeding machines, a corresponding plurality of sets of tapes carrying the paper from said feeding-machines to the main tapes, drop-rollers over the delivery ends of the tributary tapes, a sheet-assembling gage over the main tapes, a rock-shaft extending across the receiving ends of the main tapes, paper-guides extending from said rock-shaft toward the tributary tapes and normally bridging the space between said tapes and main tapes and switching upward from its normal position, an electric circuit, electromagnetically-controlled mechanism actuating said rock-shaft, and circuit makers and breakers in the planes of the tributary tapes to be actuated by the paper in transit as set forth.

48. The combination with the stitching-machine and conveyers carrying the paper to said machine, of a switch disposed in the path of said paper to throw misfed sheets from the conveyers and prevent their passage to the stitching-machine, an electric circuit, electromagnetically-controlled mechanisms operating said stitching-machine and switch to arrest the action of the stitching-machine during the switching of the paper, and circuit makers and breakers actuated by the paper in transit to the switch.

49. The combination with the stitching-machine, main tapes carrying the paper to said machine, a plurality of paper-feeding machines, tributary tapes conveying the paper from said feeding-machines to the main tapes, drop-rollers over the delivery ends of the tributary tapes, a rock-shaft extending across the receiving ends of the main tapes, paper-guides extending from said rock-shaft toward the tributary tapes and normally spanning the space between said tapes and main tapes and moving upward from said normal position, an electric circuit, electromagnetically-controlled mechanisms actuating simultaneously the stitching-machine and rock-shaft to arrest the action of the stitching-machine during the switching of the misfed sheets, and circuit makers and breakers in the planes of the tributary tapes to be actuated by the sheets in transit as set forth.

In testimony whereof I have hereunto signed my name this 7th day of January, 1897.

TALBOT C. DEXTER. [L. S.]

Witnesses:
V. E. MARSH,
J. F. COLE.